United States Patent
Leek et al.

[19]

[11] Patent Number: 6,135,687
[45] Date of Patent: Oct. 24, 2000

[54] DIRECT TENSION INDICATOR FOR EMBEDDED ANCHOR MEMBERS

[75] Inventors: William F. Leek, Carmel; M. Joe Luthy, Livermore, both of Calif.

[73] Assignee: Simpson Strong-Tie Co., Inc., Pleasanton, Calif.

[21] Appl. No.: 09/347,247

[22] Filed: Jul. 2, 1999

[51] Int. Cl.[7] .............................. F16B 31/00; F16B 31/02
[52] U.S. Cl. .................... 411/10; 411/5; 411/14; 411/82
[58] Field of Search ................. 411/3, 5, 9, 10, 411/11, 14, 82

[56] References Cited

U.S. PATENT DOCUMENTS

| 3,476,010 | 11/1969 | Markey | 411/9 |
| 4,887,948 | 12/1989 | Calmettes | 411/5 |
| 4,979,857 | 12/1990 | Wing | 411/5 |
| 5,328,300 | 7/1994 | Fischer et al. | 411/82 X |

FOREIGN PATENT DOCUMENTS

| 46-1521 | 1/1971 | Japan | 411/10 |
| 1384511 | 2/1975 | United Kingdom | 411/10 |

*Primary Examiner*—Neill Wilson
*Attorney, Agent, or Firm*—James R. Cypher; Charles R. Cypher

[57] ABSTRACT

A device used to indicate whether a predetermined compressive load has been applied to the device. The device is formed to receive an anchor member upon which a tensioning force is to be applied in conjunction with loading the device. The device itself has an upper press that has an aperture formed to receive the anchor member and also has means for manipulating a washer. The device also has a lower die with an aperture formed to receive the anchor member. The lower die is formed so as to be able to work in conjunction with the upper press when the upper press and lower die are aligned and moved towards each other. The lower die also has means for manipulating the washer. The means for manipulating the washer are also formed to cooperate with the means for manipulating the washer on the upper press. The device also has a washer that lies between the upper press and the lower die. The washer is formed so that when the washer is acted upon by the means for manipulating the washer of the upper press and the lower die it will indicate visually whether a selected compression load has been applied to the washer.

24 Claims, 16 Drawing Sheets

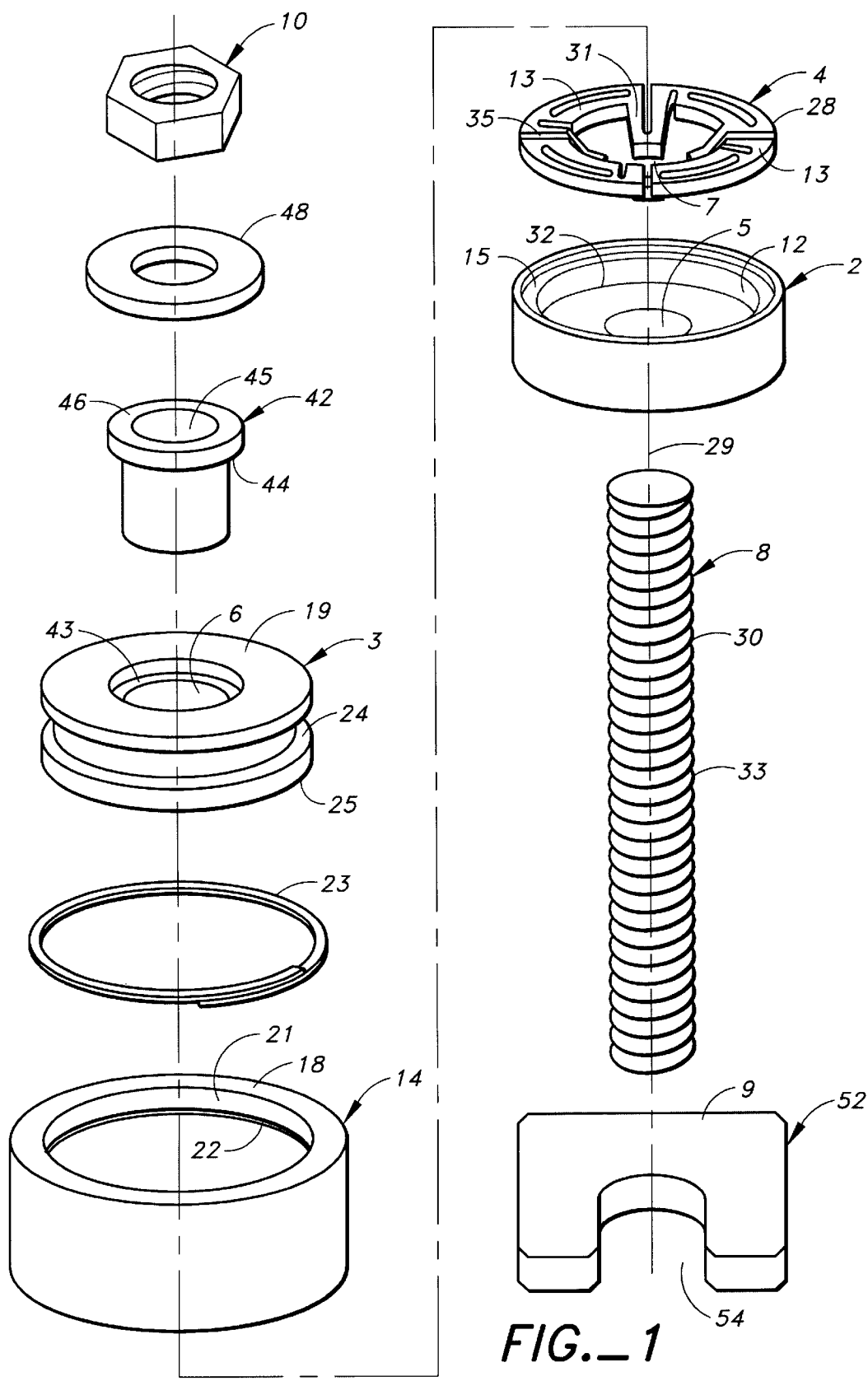
FIG._1

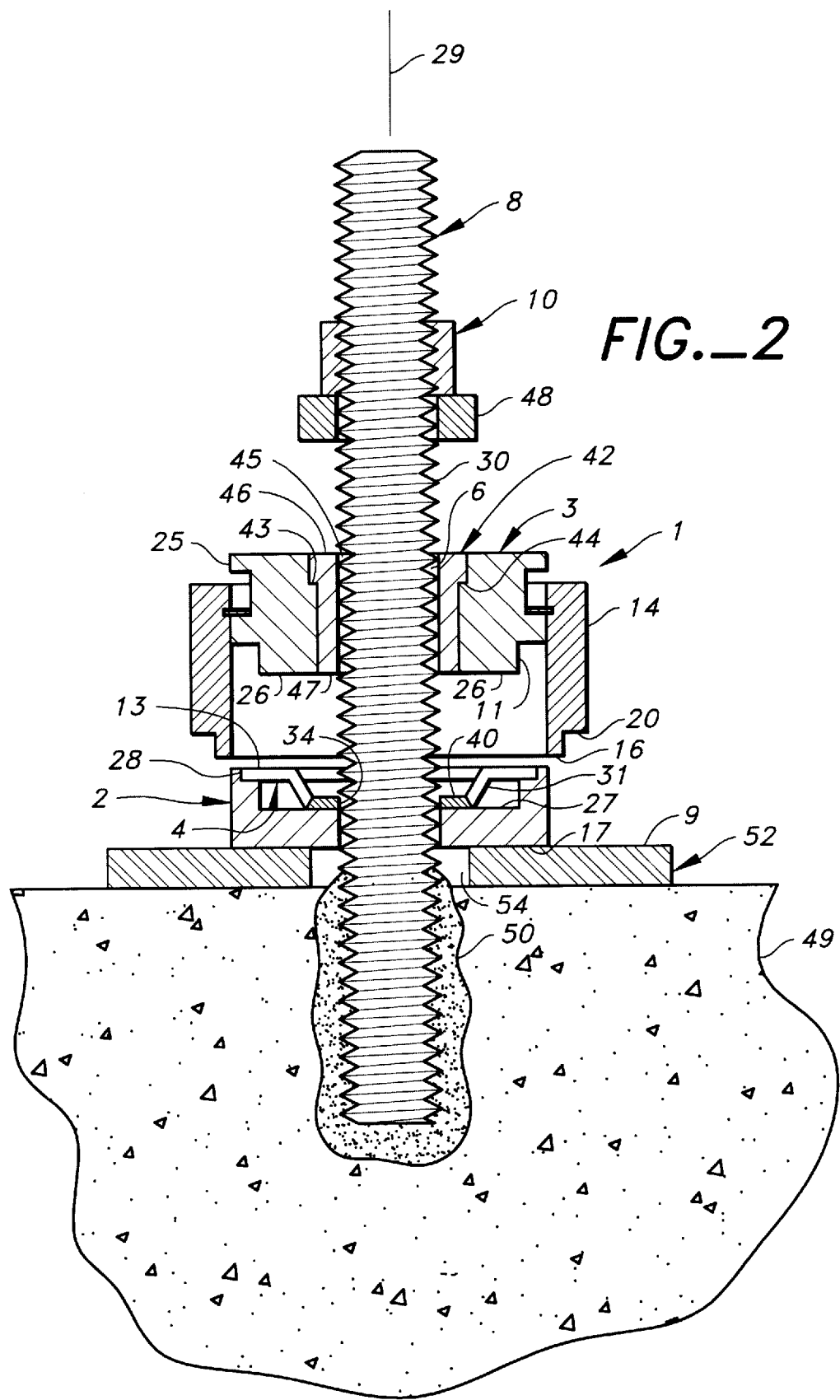
FIG._2

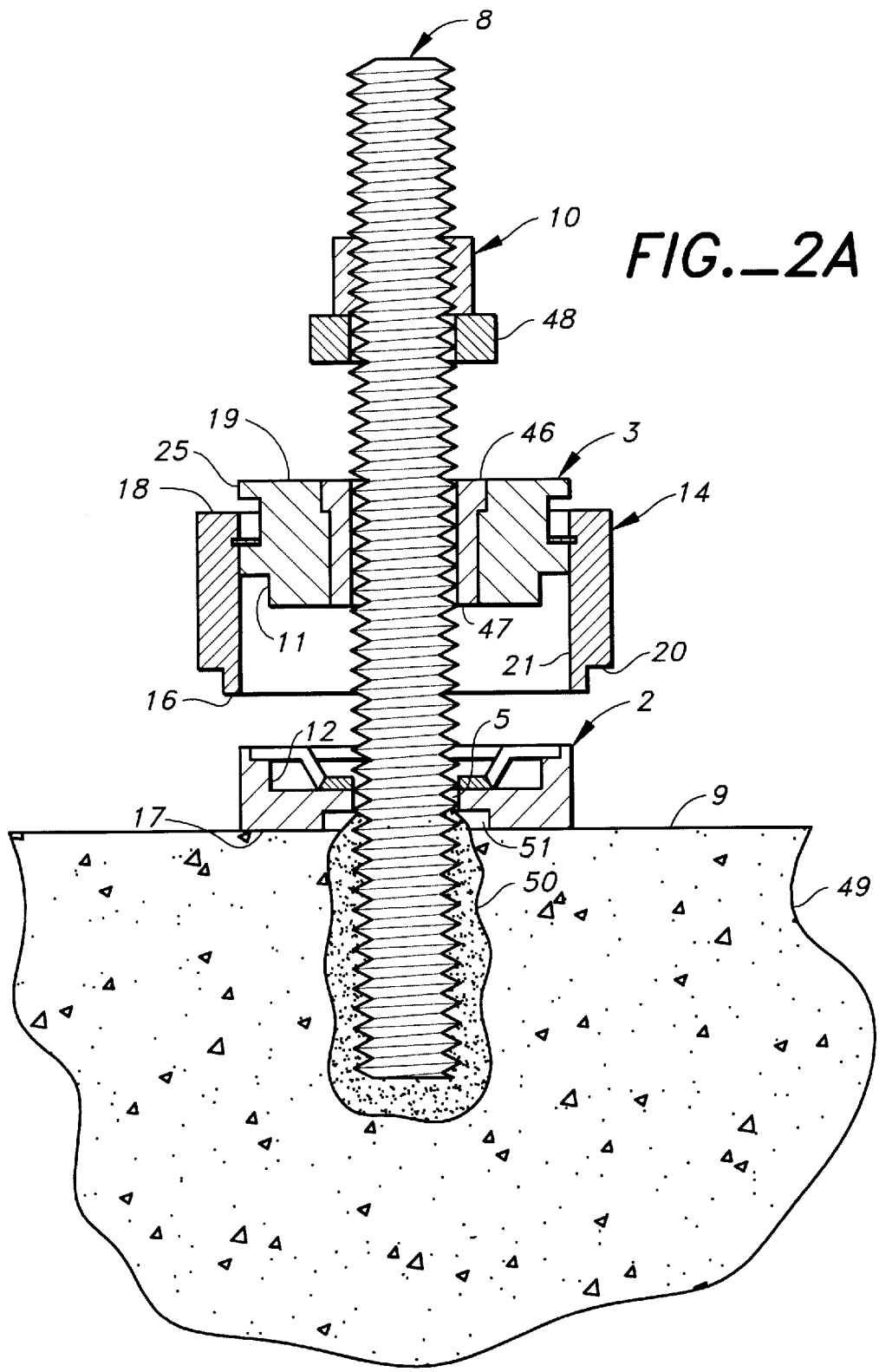

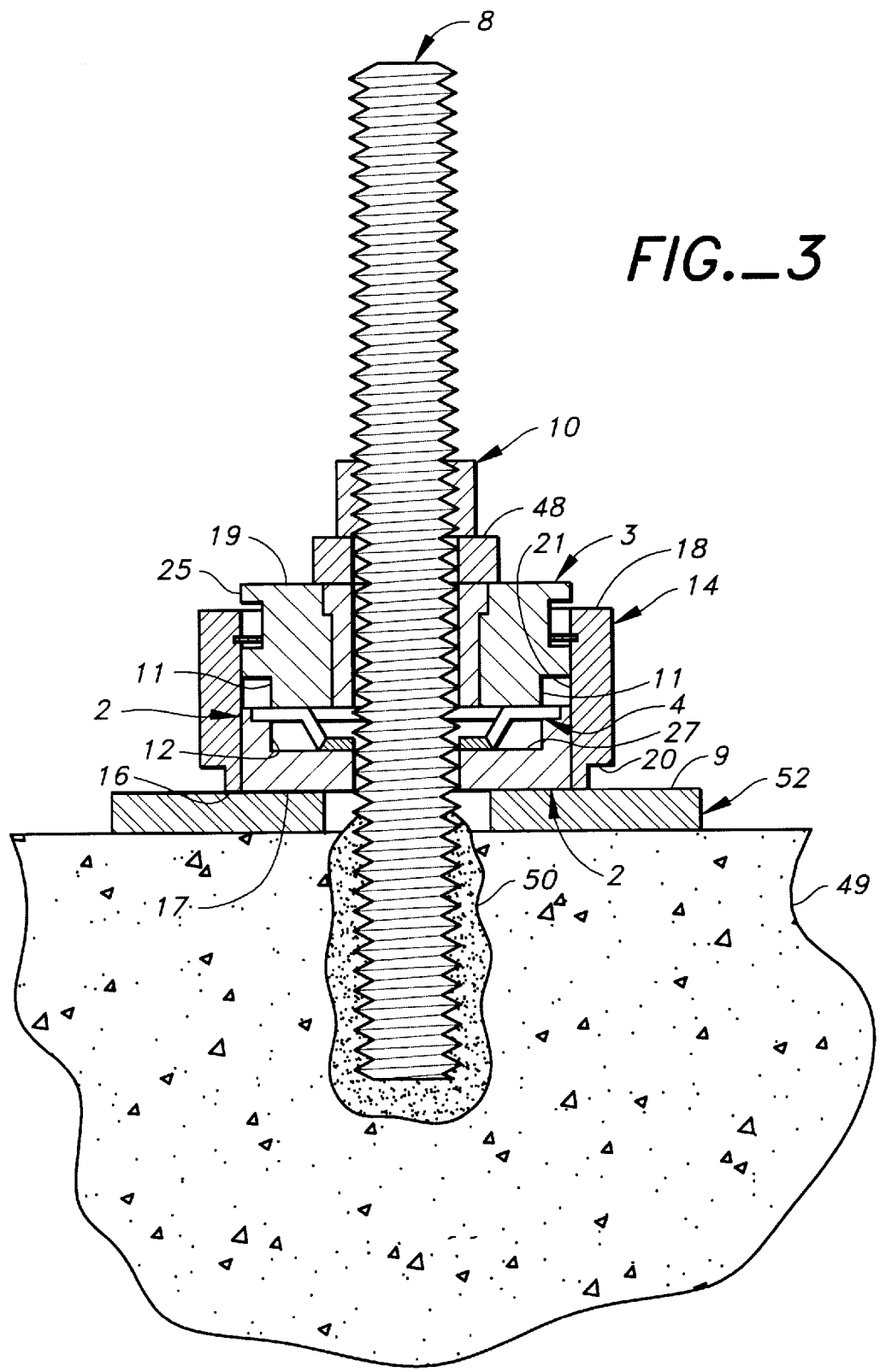
FIG._3

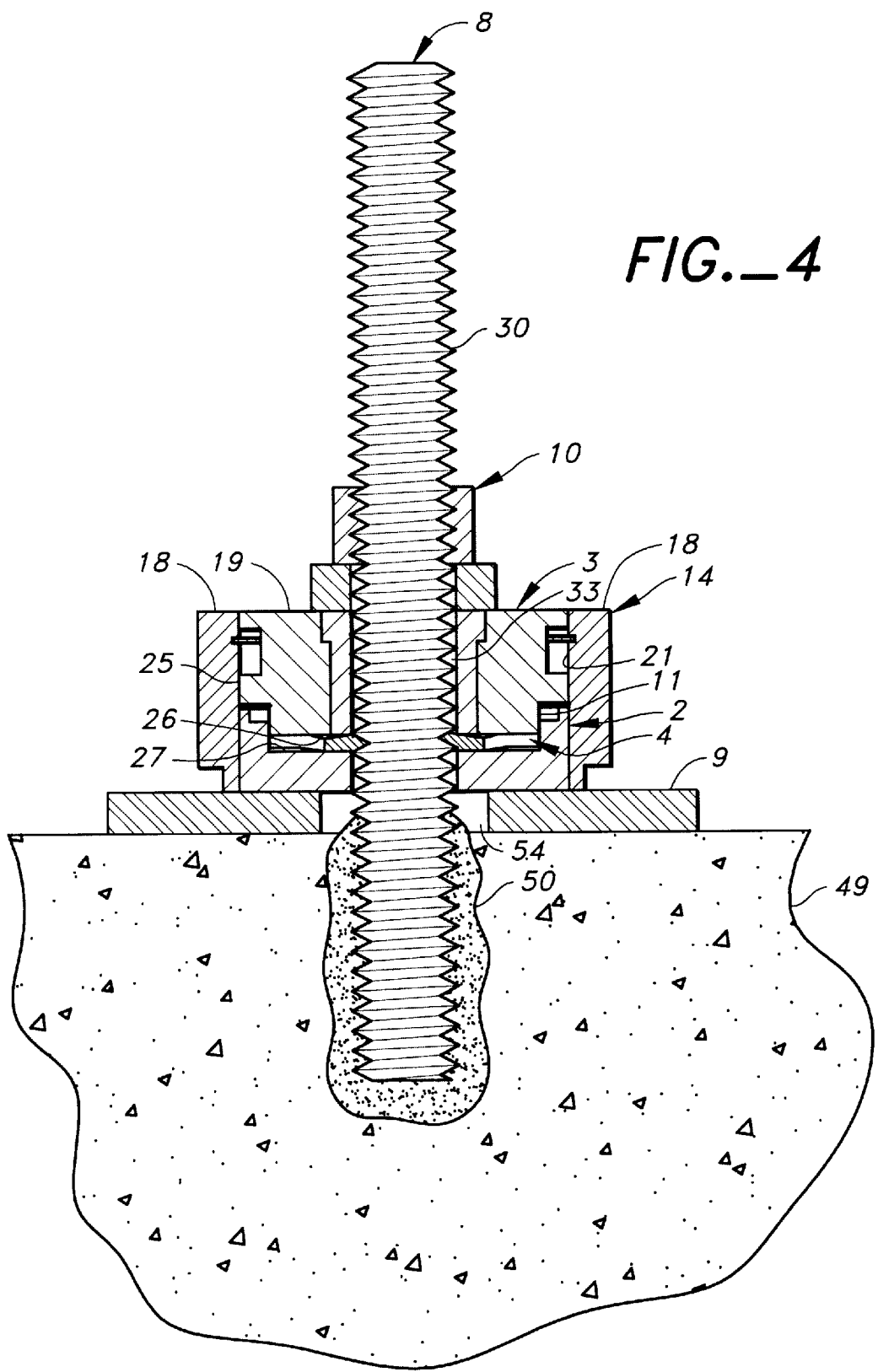
FIG._4

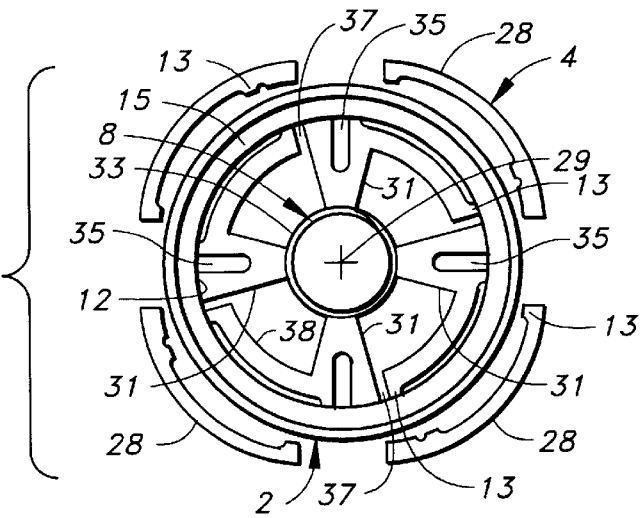
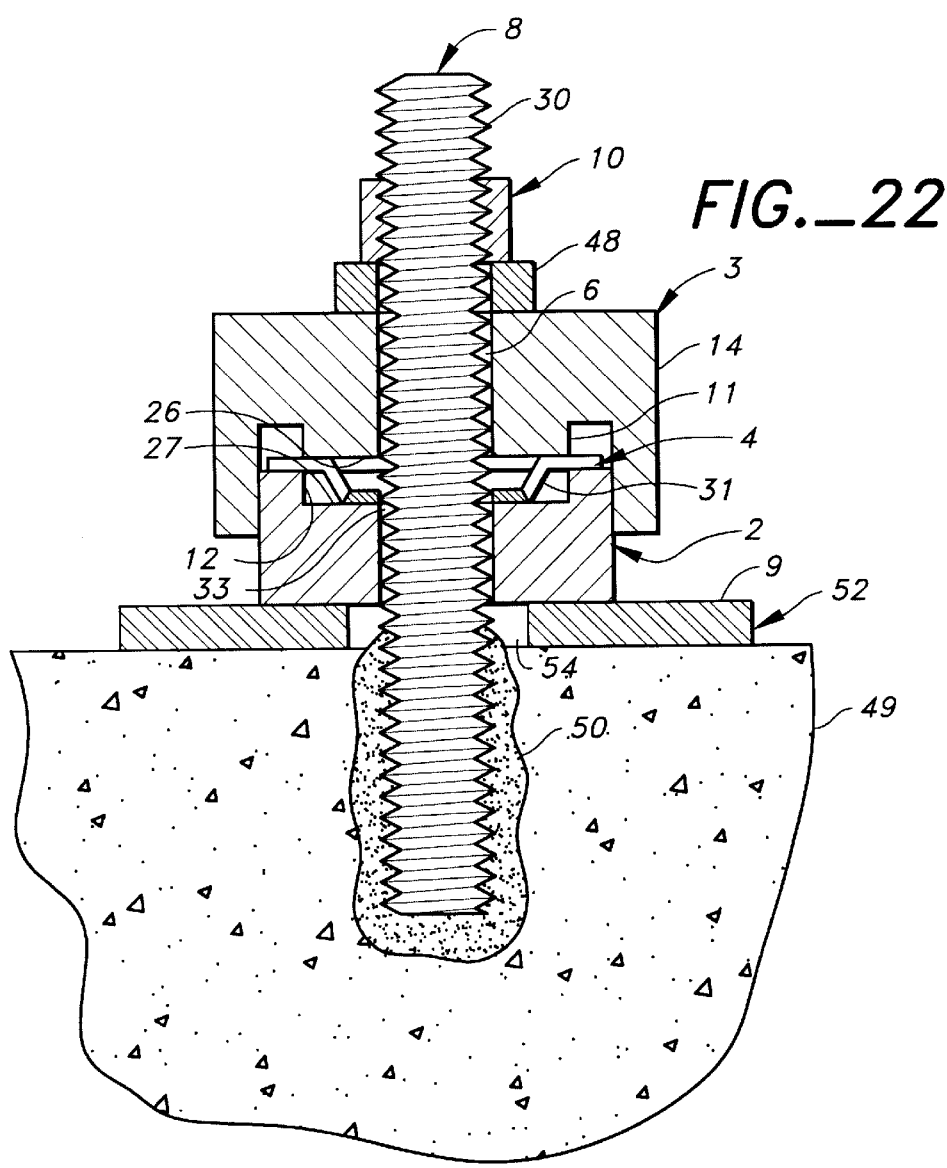

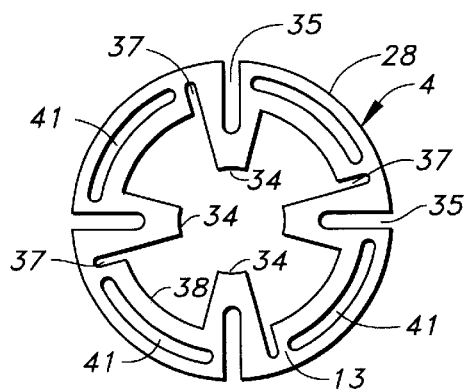
FIG._6
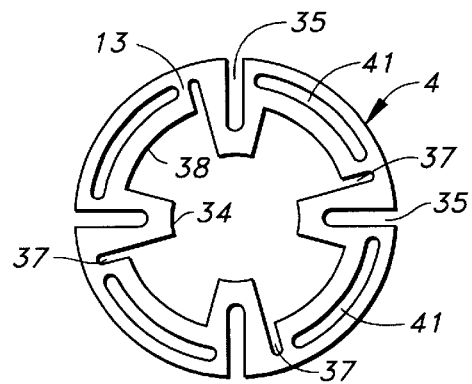
FIG._7
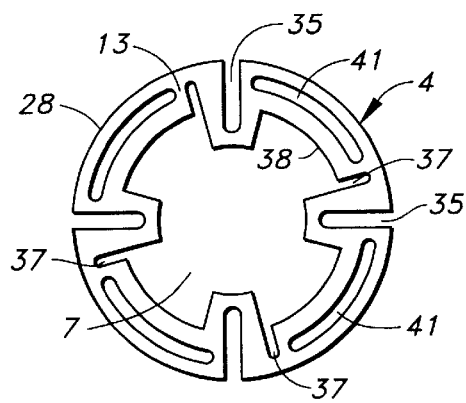
FIG._8
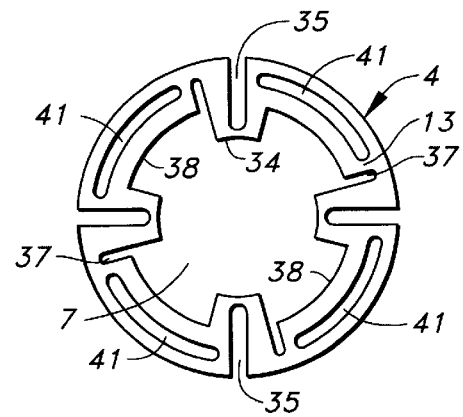
FIG._9
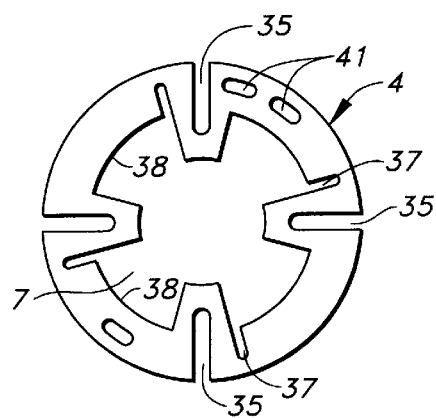
FIG._10
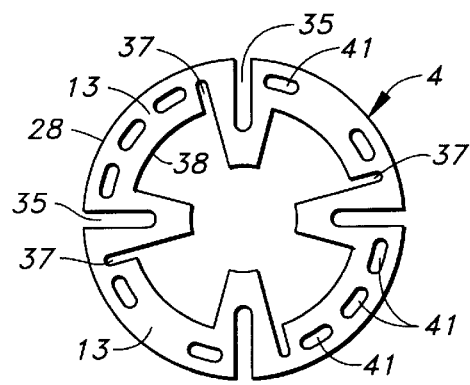
FIG._11

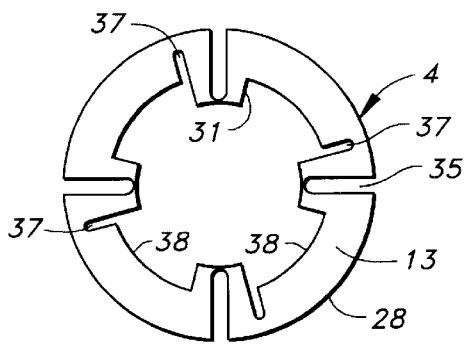
FIG._12
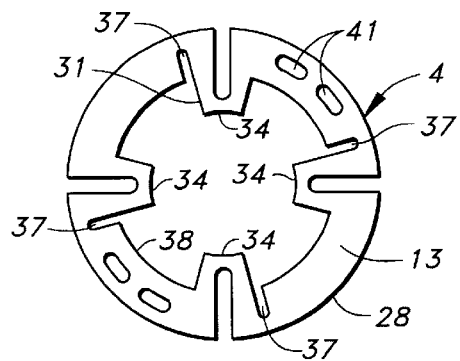
FIG._13
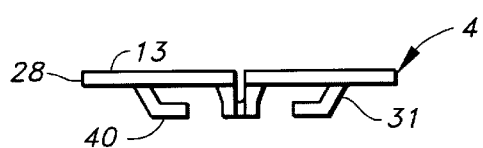
FIG._14
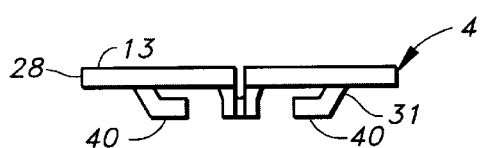
FIG._15
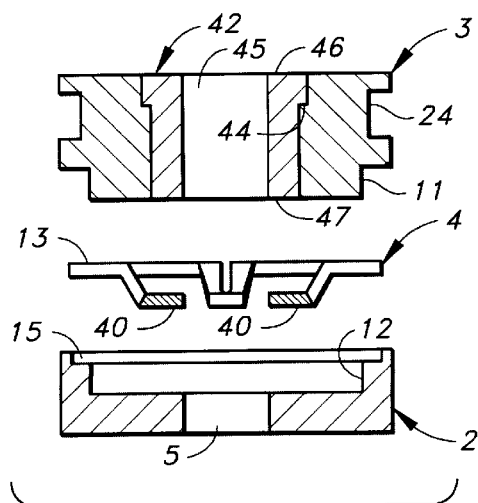
FIG._16
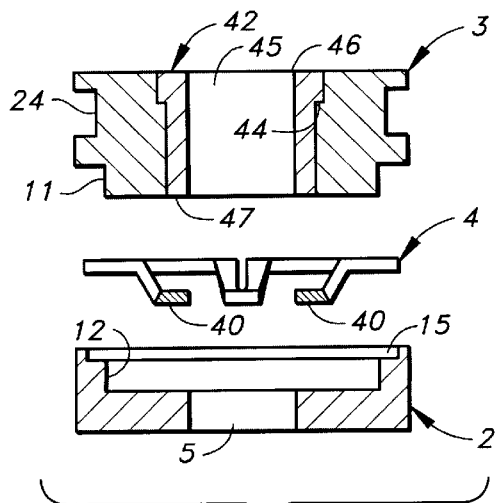
FIG._17

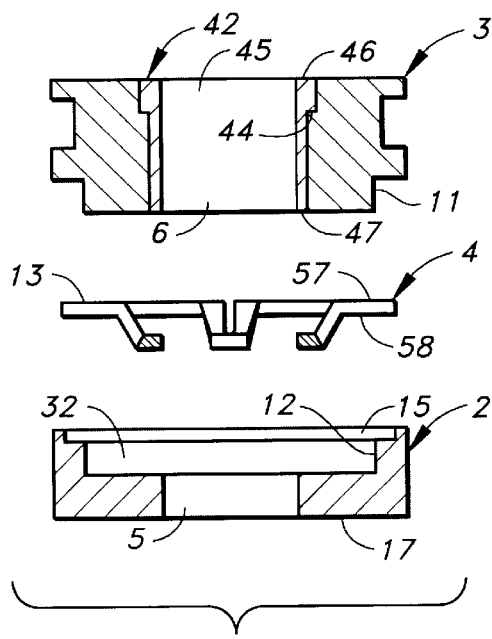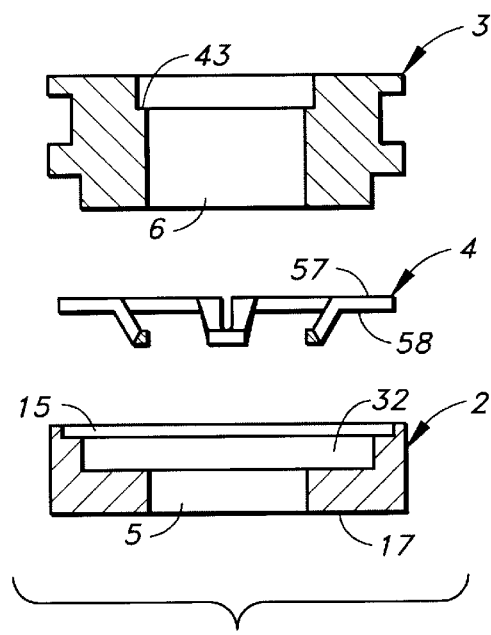
FIG._18    FIG._19
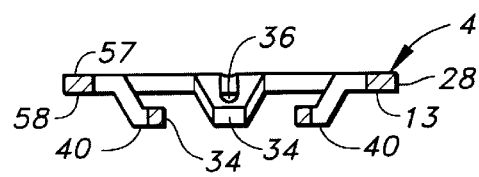
FIG._23
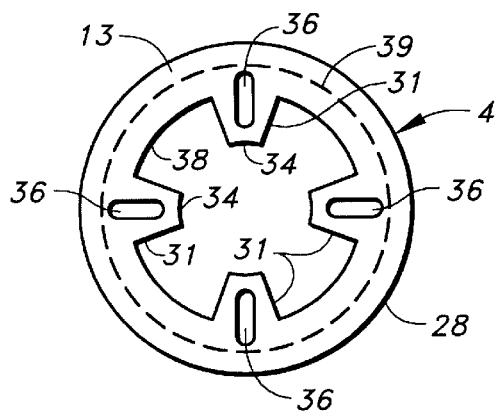
FIG._24

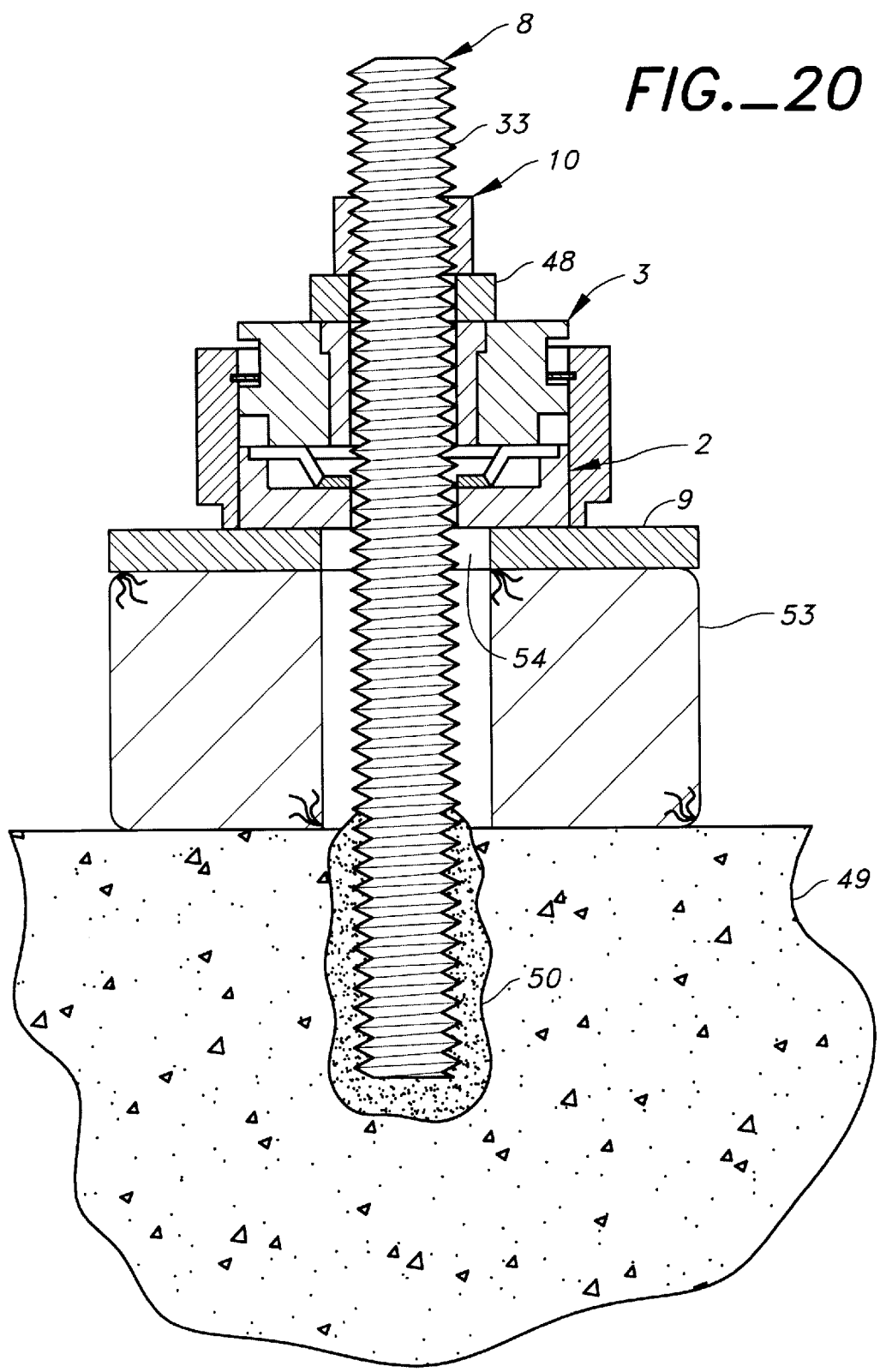

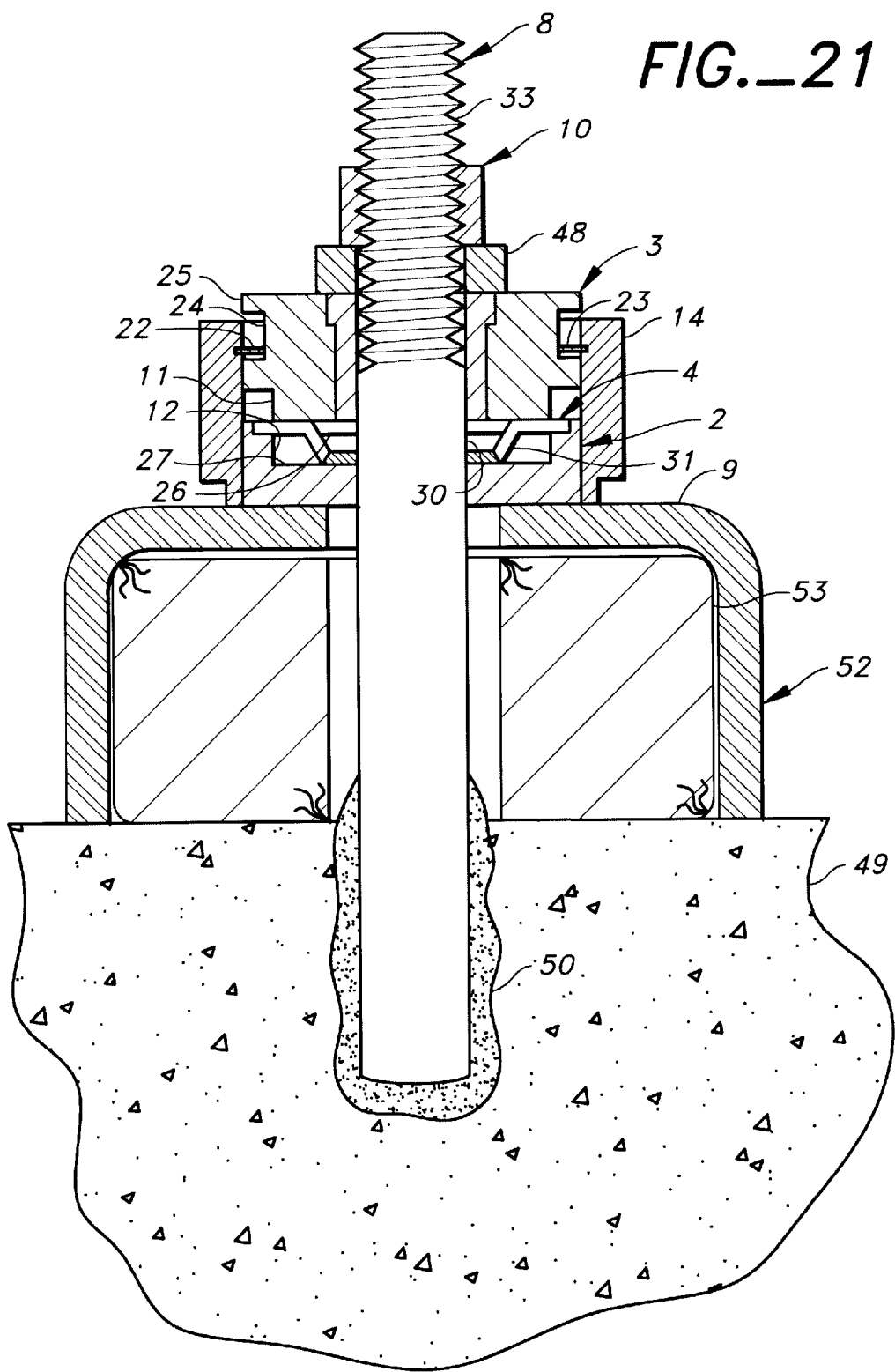
FIG._21

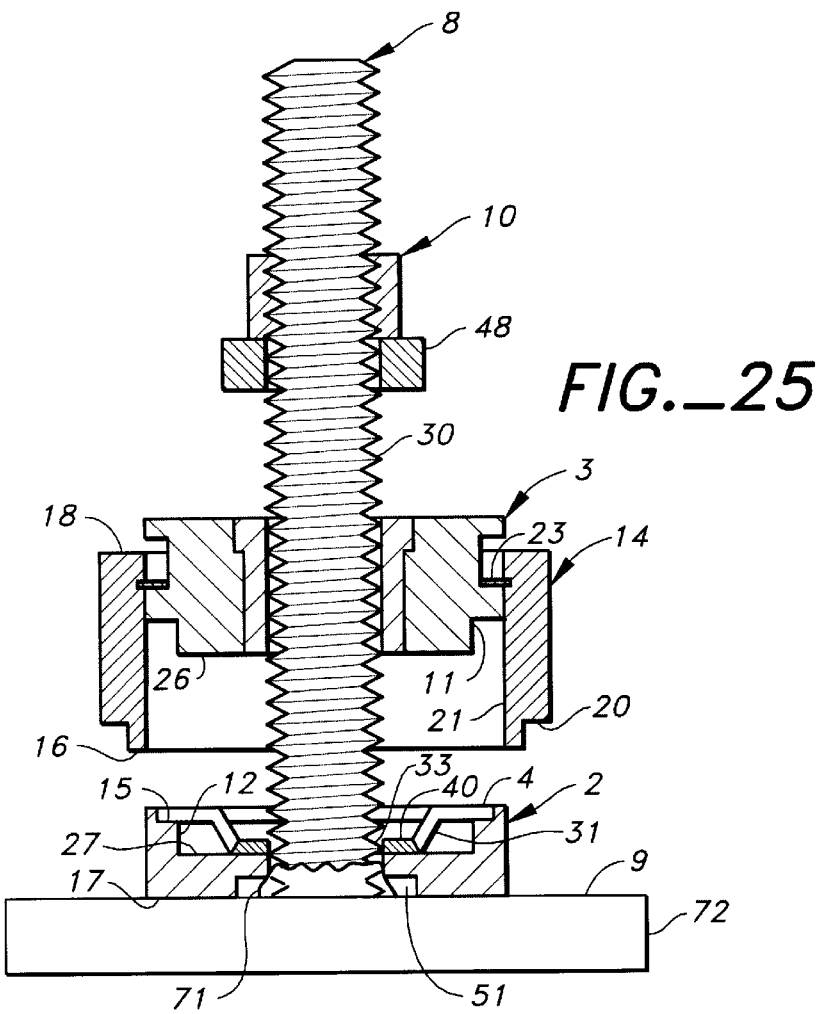
FIG._25
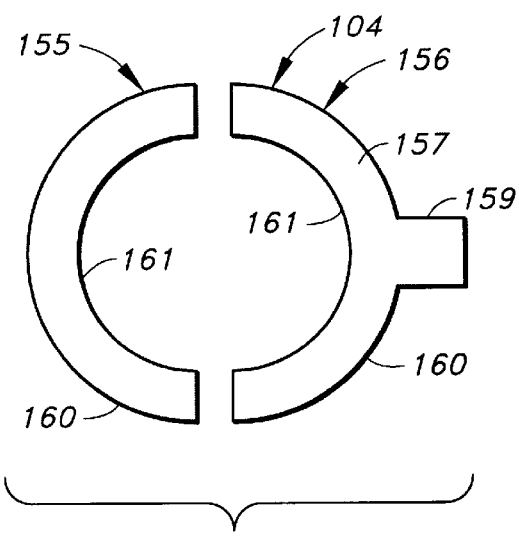
FIG._27
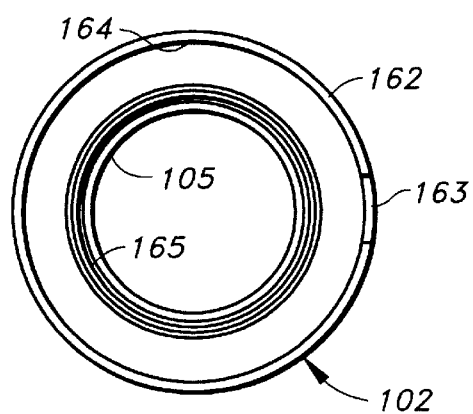
FIG._28

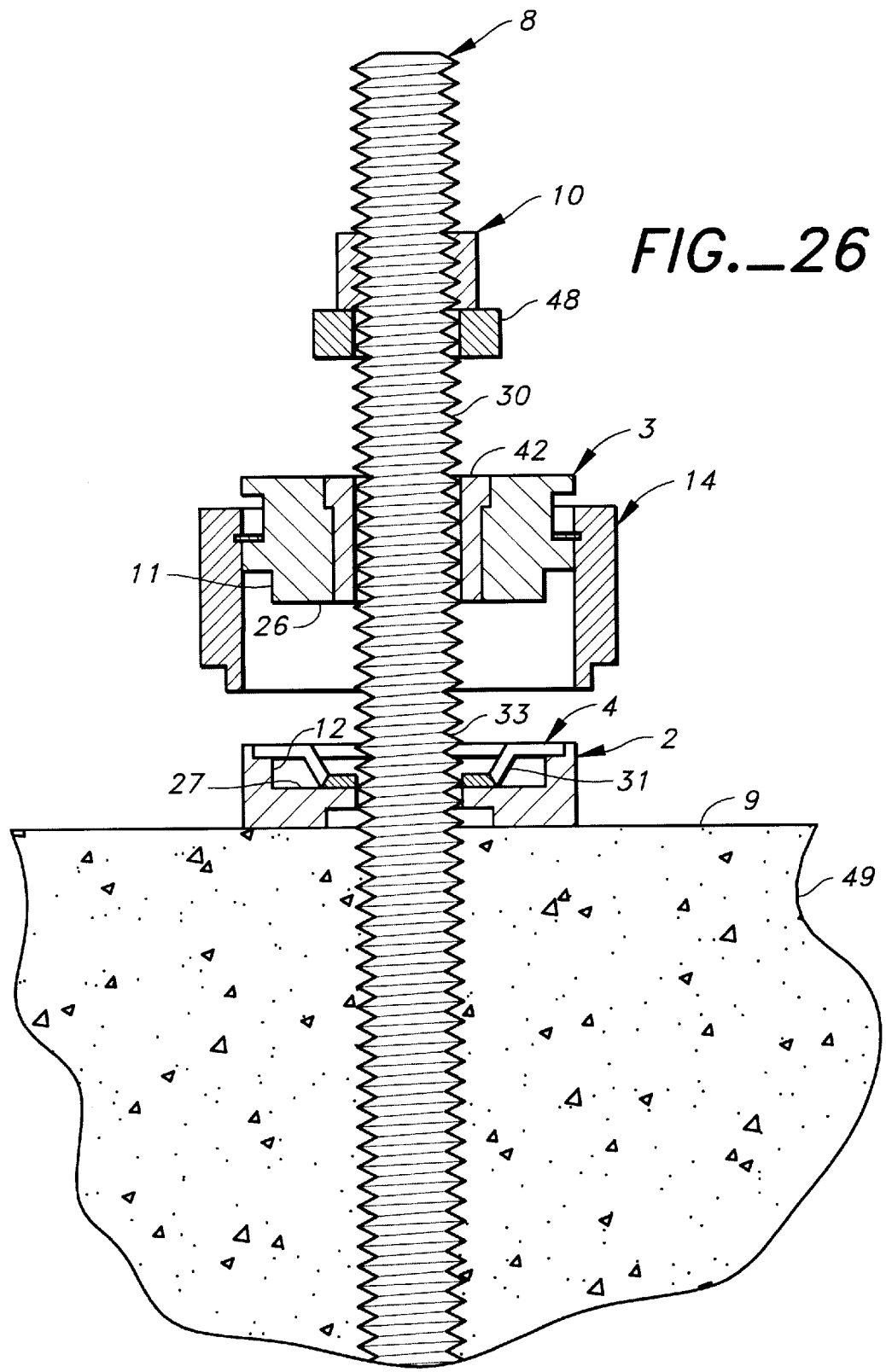
FIG._26

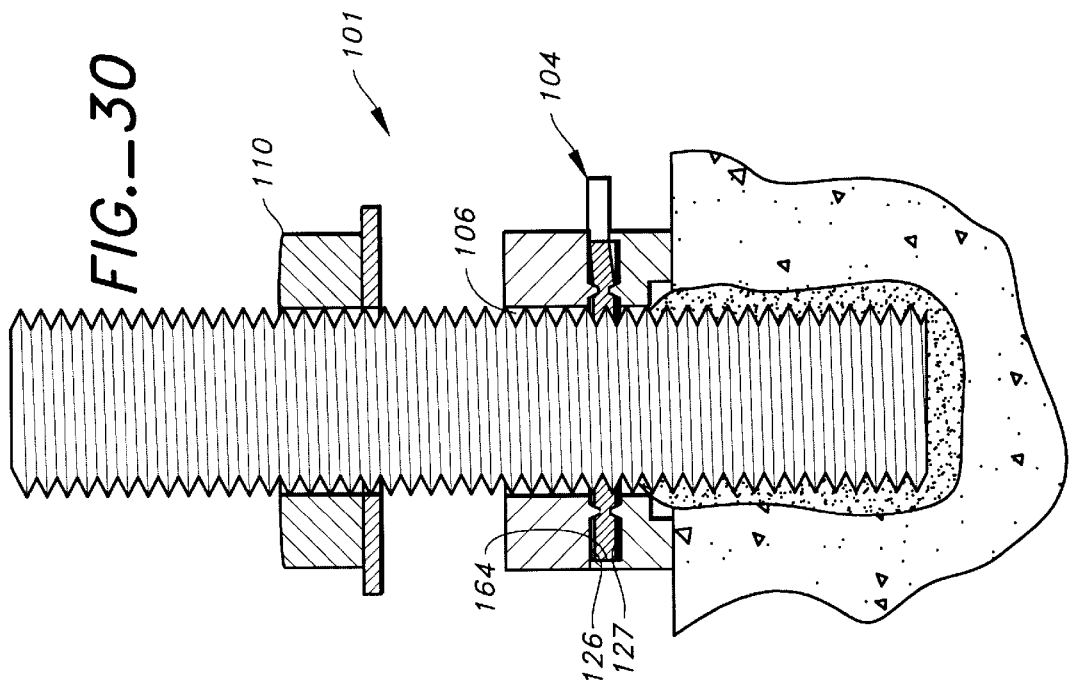
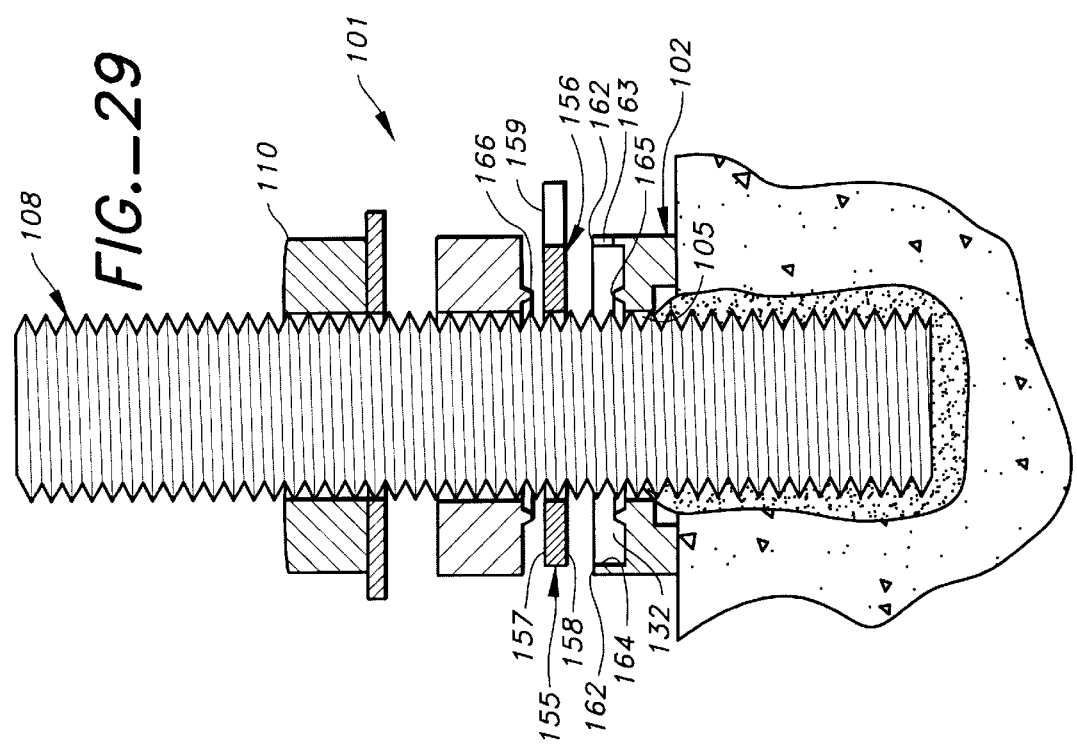

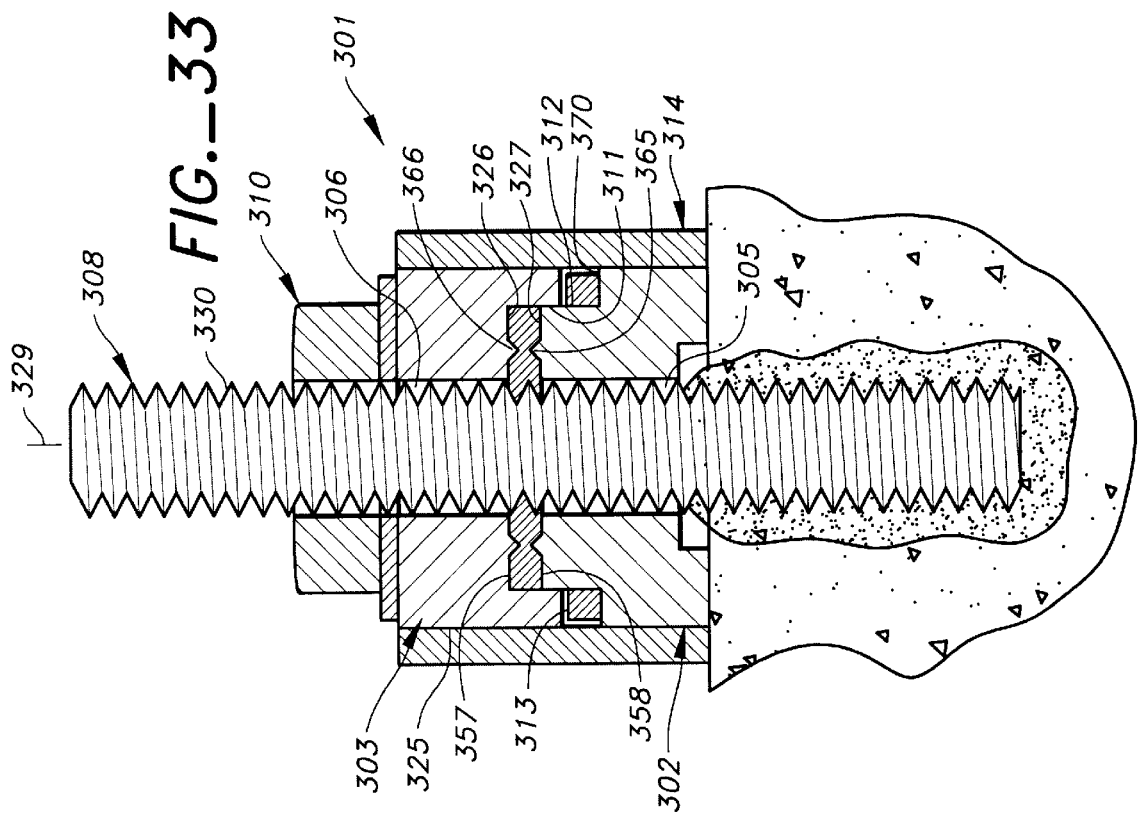
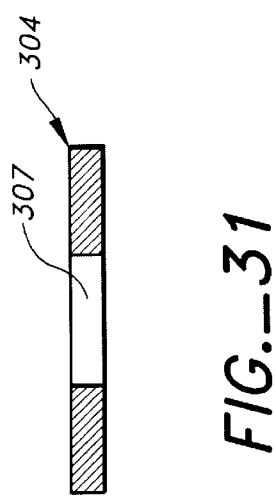
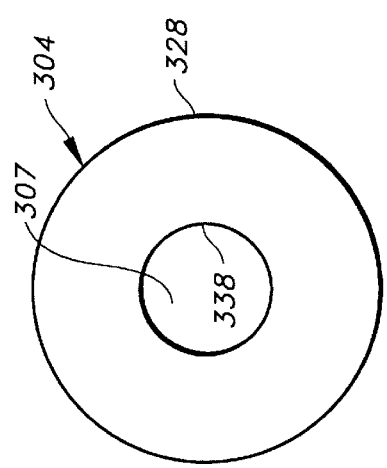

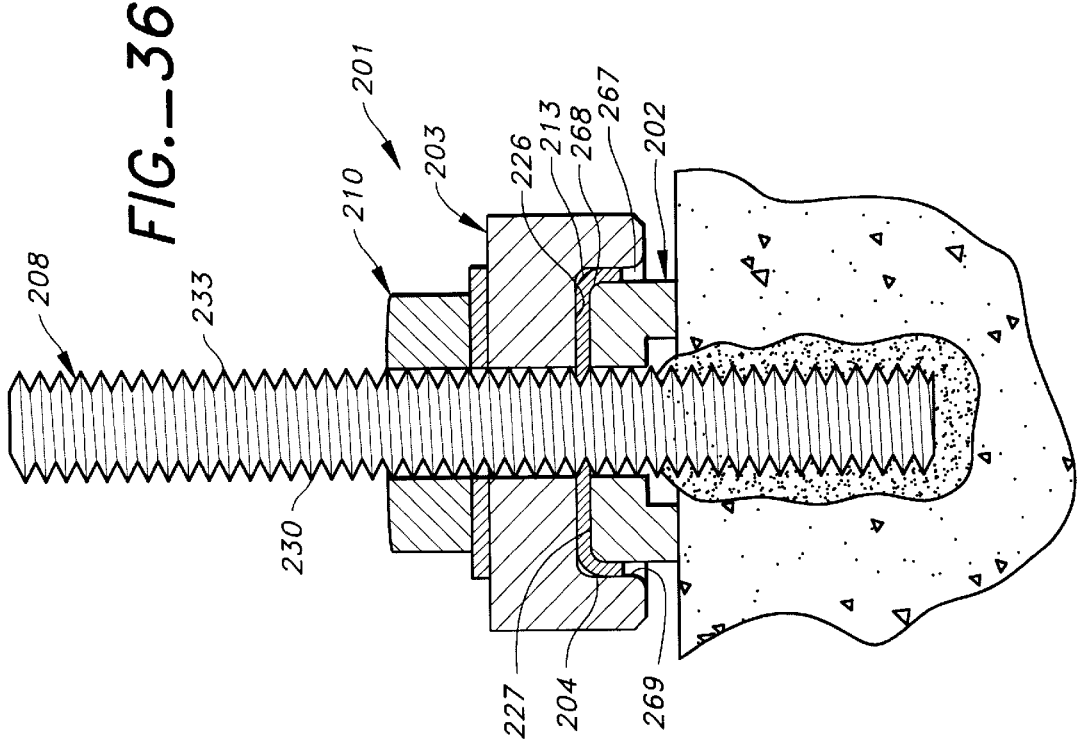
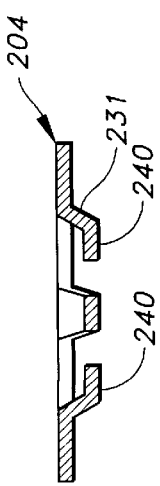
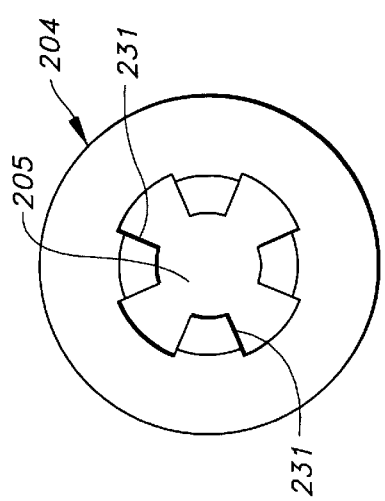

DIRECT TENSION INDICATOR FOR EMBEDDED ANCHOR MEMBERS

BACKGROUND OF THE INVENTION

This invention relates to devices for testing whether an anchored member can resist a selected tension load. The present invention is especially useful in testing whether a retrofit anchor bolt embedded into a pre-existing concrete cementitious member is sufficiently secure to resist being pulled from the cementitious member when a selected tension load is applied. The present invention comprises both the device itself and the method of using the device.

In the light building industry, a number of different methods are used for checking the integrity of a bolt embedded in a cementitious member.

The most obvious method is, of course, to actually test an embedded anchor bolt's resistance to being pulled out of a cementitious member. Portable load cylinders have been developed to test the connection between anchor bolts and the cementitious member in which they are embedded. However, load cylinders are expensive to maintain and transport to a job site, and the actual testing of the bolts can be time consuming. Because the use of load cylinders is expensive, usually only a selected number of bolts are tested rather than all the bolts. The present invention improves upon this method by applying a tensile load to the bolt without the use of an expensive load cylinder.

Because the actual testing of bolts has been so expensive and time consuming, another alternative of checking the integrity of retrofit anchor bolts has developed. In this method, the integrity of the anchor bolt-cementitious member connection is safeguarded by having an inspector make sure that code-accepted practice for preparing a cementitious member or retrofitting bolts in a cementitious member is followed by actually having him observe the process. Again, this can be considered to be wasteful of time, especially if the inspector is not available to observe the process when it is convenient for the builder, such that the builder has to wait for the inspector.

Outside of the light building trade, a number of methods have developed for testing bolt connections that rely on relatively simple mechanical devices. These devices are found in heavy construction, mining and automobile building where bolt connections are critical. These devices usually consist of compression washer and nut combinations that can be used to measure the pull-out loads applied to a bolt, or alternatively the compression forces generated between a structural member that receives and anchors a threaded bolt and a nut threaded onto the bolt.

Most of these simple devices work along similar principles. A bolt having a threaded end is anchored in a structural member. The bolt is either held or anchored in such a manner that it cannot rotate with respect to the structural member. The threads on the bolt extend from the end of the bolt and past a bearing surface that is either part of the structural member that anchors the bolt or is in unyielding contact with the structural member. The load-indicating device is slipped over the threaded end of the bolt so that it is disposed against the bearing surface. A nut is then threaded onto the bolt, and tightened down so that it comes into contact with the load indicating device. After the nut comes into contact with the load-indicating device, torque is continuously applied to the nut until, hopefully, a designed-for failure of the load-indicating device occurs. Applying torque to the nut causes it to compress the load-indicating device between itself and the bearing surface. This creates an equal but opposite tension force between the bolt and the structural member anchoring it, testing that connection.

The load indicating device is designed to fail under a selected compressive force. Generally, the load-indicating device is selected to fail before the other members, but at a point where a meaningful load has been applied that tests the strength of the bolt and the strength of the connection between the bolt and the structural member.

Failure of the load-indicating device is indicated in a variety of fashions, and many devices are designed to fail once at a given load, but then be able to perform well beyond that load for the life-time of the connection. These particular devices are designed to be left in place after the connection has been tested. Other devices are used to measure whether a selected load on the bolt exceeds a given value.

Simple mechanical devices include washers having raised protuberances which are compressed back into the body of the washer under a given load. Other such members have a weakened intermediary portion between two main portions, the intermediary portion failing and allowing the two main portions to then bear on each other without similar failure at well beyond the first load. Other devices use washers that are broken between cooperating dies and punches. Other devices bend intermediate washer rather than break them. Some such devices are even designed to provide an indication when the selected load is removed from the load indicating device.

The device of the present invention differs from the devices of the prior art of which the inventor is aware by providing a tamper resistant method of proving that a bolt has been tested at a given load, without having to maintain the load on the bolt.

SUMMARY OF THE INVENTION

In its most basic form, the present invention is a device for indicating whether a predetermined compressive load has been applied to the device. The device is formed to receive an anchor member upon which a tensioning force is to be applied in conjunction with loading the device.

The device can be used on a variety of anchor members embedded in cementitious members. Cementitious members can be concrete block, brick, masonry, rock, and concrete to name a few examples. Commonly used anchor members include: threaded members all-thread rod, carriage bolts, bolts of various shapes and other types of mechanical anchors.

The anchor member can be embedded directly in the cementitious member, or it can be received by a blind opening and bonded to the cementitious member by means of an adhesive. The adhesive could include a cementitious grout, epoxy, an acrylic adhesive, a polyester, vinyl ester or some other types of bonding agent The device can also be used on anchor members welded or bonded to a steel plate.

The device itself has an upper press that has an aperture formed to receive the anchor member and also has means for manipulating a washer. The device also has a lower die with an aperture formed to receive the anchor member. The lower die is formed so as to be able to work in conjunction with the upper press when the upper press and lower die are aligned and moved towards each other. The lower die also has means for manipulating the washer. The means for manipulating the washer are also formed to cooperate with the means for manipulating the washer on the upper press. The device also has a washer that lies between the upper press and the lower die. The washer is formed so that when the washer is acted upon by the means for manipulating the washer of the upper press and the lower die it will indicate visually whether a selected compression load has been applied to the washer.

The washer member can also have one or more inner portions that are formed so that when the washer is acted upon by the means for manipulating the washer, one or more inner portions can extend inwardly toward the anchor member and can be pressed into said anchor member.

The present invention also pertains to a method of applying a tension load to an anchor member held in a cementitious member. First, a lower die is slipped over the anchor member so that the lower die rests on the cementitious member. A bearing plate could also be put over the anchor member first, and the lower die could rest on it. A washer can already be inserted into the lower die and slipped over the anchor member with it, or it can be slipped over the anchor member separately. A upper press is then slipped onto the anchor member and over the washer member and lower die. Sometimes the upper press can be formed with an alignment member, or it can have an alignment member attached to it, or a separate alignment member can be slipped around the upper press and the lower die after they have been inserted over the anchor member. Then a nut is tightened onto the anchor member until the washer member is deformed in a manner such that it provides a visual indication that a given load has been applied to the washer and the washer has been pressed into the anchor member. The nut can then be removed, removing the compressive force from the upper press, the washer and the lower die, however, the washer remains locked onto the anchor member.

It is an object of the present invention to provide a simple, inexpensive means for testing whether an anchored bolt can resist a given tension load.

This object is accomplished in part by providing a load-indicating device in which a relatively inexpensive, disposable member is broken or deformed at a predetermined load by a cooperating die and press. When the washer is broken at a predetermined load, it is done so by a breaking action which is at least in part shearing. This object is further accomplished by making the die and press as relatively small and light-weight members that can be manually set-up and operated by a single user with readily available hand-tools.

It is another object of the present invention to provide a load indicating device that provides clear evidence that the bolt has been tested. The disposable washer is designed to adopt an easily recognized final shape when a given load has been applied. The final shape of the washer can be either a product of breaking the washer or a combination of the breaking and deforming the washer. This object is also accomplished in part by the use of a disposable washer which is deformed when a selected load is applied. This object is further accomplished by the design which allows the press to be removed from the bolt so that the broken washer can be easily viewed.

It is a further object to provide a load-indicating device that readily indicates to the operator applying the load to the device that a selected load has been achieved. In the embodiments that work with a shearing action, this is accomplished by having the cooperating die and press break the washer in a manner such that there is significantly less resistance to the compressive force generated by the operator after the washer has been sheared by a given load.

It is a further object of the present invention to provide tamper resistant evidence that the bolt has been tested. This is accomplished by deforming the disposable washer during and after the testing operation such that it can be locked onto the threads and between the bolt and either the lower die or upper press.

The objects of providing a simple and inexpensive testing device are further accomplished in the preferred embodiment by forming the press and die so that the press can be reused. The die can also be reused, however, it has been found that is preferable to make the die disposable as well. In the preferred embodiment, the die is made of comparatively soft material with respect to the press. This achieves two objects. First, since it is soft, if for some reason the cooperating press and die are misaligned or the washer prematurely fails and damage to the device is sustained, the damage is more likely to be borne by the die. Thus the press is preserved, extending its life. Second, it is less expensive to form the lower die of a relatively soft material, and as indicated below, in the preferred embodiment, to provide evidence that a bolt has been tested it is necessary to leave the lower die and the broken washer on the bolt until it has been examined. Also, as a matter of convenience for the user, it is desirable to sell the disposable washer pre-loaded into the lower die.

DESCRIPTION OF THE DRAWINGS

FIG. 1 an exploded perspective view of the preferred embodiment of the present invention. The present invention is shown being used with a bearing plate and a nut and washer that are used for generating the compression for on the direct tension indicator.

FIG. 2 is a side view of the preferred embodiment of the present invention. The direct tension indicator is shown in cross-section along with the cementitious member and the adhesive agent bonding the anchor member to the cementitious member. A bearing plate is also shown, along with a nut and a washer that overlies the upper press. The upper press along with an attached anchor sleeve are shown being inserted over the anchor member. A nut and corresponding washer are shown being threaded onto the anchor member.

FIG. 2A is a similar view to FIG. 2. The bearing plate has been removed. The lower die is shown with a scalloped portion that accommodates an adhesive agent such as epoxy that is shown projecting above the cementitious member.

FIG. 3 is similar to FIG. 2. The preferred embodiment is shown just before the compressive force is applied to it.

FIG. 4 is a similar view to FIG. 2. The preferred embodiment is shown after a compressive force has been applied to it that is sufficient to shear the washer and drive the inwardly projecting portions onto the threads of the anchor member.

FIG. 5 is a top view of the disposable washer and lower die inserted over an anchor member after the disposable washer has been broken and driven onto the anchor member. Pieces of the outer portion of the disposable washer have been broken off and are shown lying along side the lower die for clarity. These pieces would be normally found in the upper recess after the upper press had been removed. The disposable washer member has also been broken into four pieces that remain locked between the anchor member and the lower die.

FIG. 6 is a top view of a disposable washer made according to the preferred embodiment.

FIG. 7 is a top view of another disposable washer made according to the preferred embodiment.

FIG. 8 is a top view of another disposable washer made according to the preferred embodiment.

FIG. 9 is a top view of another disposable washer made according to the preferred embodiment.

FIG. 10 is a top view of another disposable washer made according to the preferred embodiment.

FIG. 11 is a top view of another disposable washer made according to the preferred embodiment.

FIG. 12 is a top view of another disposable washer made according to the preferred embodiment.

FIG. 13 a top view of another disposable washer made according to the preferred embodiment.

FIG. 14 is a side view of the disposable washer of FIG. 6.

FIG. 15 is a side view of the disposable washer of FIG. 12.

FIG. 16 is an exploded cross-section of the upper press, disposable washer, lower die and sizing sleeve appropriate for a very narrow anchor member.

FIG. 17 is an exploded cross-section of the upper press, disposable washer, lower die and sizing sleeve appropriate for less narrow anchor member than that shown in FIG. 16.

FIG. 18 is an exploded cross-section of the upper press, disposable washer, lower die and sizing sleeve appropriate for a wide anchor member.

FIG. 19 is an exploded cross-section of the upper press, disposable washer and lower die suitable for a very wide anchor member.

FIG. 20 is a side view of the preferred embodiment of the present invention. The direct tension indicator is shown in cross-section along with the cementitious member and the adhesive agent bonding the anchor member to the cementitious member. A bearing plate is also shown, along with a nut and a washer that overlies the upper press. The lower die, disposable washer, and upper press along with an attached anchor sleeve are shown inserted over the anchor member. A nut and corresponding washer are shown threaded onto the anchor member and ready to compress the direct tension indicator. The direct tension indicator is shown resting on a bearing plate that in turn rests on a mudsill.

FIG. 21 is similar to FIG. 22. However, it shows a modified, u-shaped bearing plate that bears upon the cementitious member. Also the anchor member is only partially threaded with the inwardly projecting portions of the disposable washer member set to be pressed into the non-threaded portion of the anchor member.

FIG. 22 is a side view of an embodiment of the present invention. The direct tension indicator is shown in cross-section along with the cementitious member and the adhesive agent bonding the anchor member to the cementitious member. A bearing plate is also shown. The lower die, disposable washer, and upper press along with an attached anchor sleeve are shown inserted over the anchor member. In this embodiment the alignment member is formed as part of the upper press.

FIG. 23 is a cross-sectional side view of a disposable washer formed according to the present invention.

FIG. 24 is a top view of the washer of FIG. 23.

FIG. 25 is a side view of an embodiment of the present invention. The direct tension indicator is shown in cross-section. The direct tension indicator is shown inserted onto an anchor member welded to a steel plate. The lower die, disposable washer, and upper press along with an attached anchor sleeve are shown being inserted over the anchor member. A nut and washer are also shown for compressing the direct tension indicator between the steel plate and itself.

FIG. 26 is a side view of an embodiment of the present invention. The direct tension indicator is shown in cross-section. The direct tension indicator is shown inserted onto an anchor member embedded in a concrete foundation. The lower die, disposable washer, and upper press along with an attached anchor sleeve are shown being inserted over the anchor member. A nut and washer are also shown for compressing the direct tension indicator between the concrete foundation and itself.

FIG. 27 is a top view of an alternate embodiment of the disposable washer member.

FIG. 28 is a top view of the lower die of an alternate embodiment formed with a bearing surface having an annular compression ridge and an outer rim.

FIG. 29 is a side view of an alternate embodiment of the present invention. The direct tension indicator is shown in cross-section, along with the cementitious member. The lower die, disposable washer, and upper press are shown being inserted onto an anchor member A nut and washer are also shown being inserted onto the anchor member.

FIG. 30 is a similar view to FIG. 29, showing the direct tension indicator after the compressive load has been applied to deform the washer and wedge it onto anchor member.

FIG. 31 is a cross-sectional side view of an alternate washer member to be used with the direct tension indicator shown in FIG. 33.

FIG. 32 is a side view of the washer of FIG. 31.

FIG. 33 is a side view of an alternate direct tension indicator, shown after the disposable washer has been cut and pressed onto the anchor bolt. This particular embodiment is shown with an alignment sleeve.

FIG. 34 is a cross-sectional side view of an alternate washer member to be used with the direct tension indicator shown in FIG. 36.

FIG. 35 is a top view of the washer of FIG. 34.

FIG. 36 is a side view of an alternate direct tension indicator, shown after the disposable washer has been bent and pressed onto the anchor bolt.

DETAILED DESCRIPTION OF THE INVENTION AND THE PREFERRED EMBODIMENT

As shown in FIGS. 1 and 2, in its simplest form, the device 1 consists of a die 2, a press 3, and a disposable washer 4 disposed between them. Each of the die 2, press 3 and washer 4 are formed with apertures 5, 6 and 7 for fitting over an anchor member 8. The die 2 and press 3 operate on the washer 4 as load is applied to them. The lower die 2 bears upon an unyielding bearing surface 9, and the upper press 3 is pushed towards the die 2 by a nut 10 threaded onto the anchor member 8. The washer 4 breaks or deforms when the compression load between the press 3 and die 2 is greater than or equal to a predetermined value.

The upper press 3 and lower die 2 are formed with means for manipulating a washer 4 which cooperatively act upon the disposable washer 4. See FIG. 2A. The lower die 2 is formed so as to be able to work in conjunction with the upper press 3, when the upper press 3 and lower die 2 are aligned and moved towards each other. The disposable washer 4 is formed so that when the washer 4 is acted upon by the means for manipulating the washer 4 of the upper press 3 and the lower die 2 it will indicate visually whether a selected compression load has been applied to the washer 4. The washer 4 also has one or more inner portions that are formed so that when the washer 4 is acted upon by the means for manipulating the washer 4, these inner portions can extend inwardly toward the anchor member 8 and can be pressed into the anchor member 8.

In the preferred form, the upper press 3 and lower die 2 have shearing formations 11 and 12 that contact the washer 4 to cooperatively break the washer 4 when the predetermined load is reached. In the preferred form, these shearing formations 11 and 12 make up part of the means for manipulating the washer 4. The washer 4 is broken by an action between the formations 11 and 12 that is shearing for the most part. Preferably, the shearing formations 11 and 12 comprise a pair of annular cutting surfaces, one on the press 3 and one on the die 2 that nest one-within-the other. The shearing formations 11 and 12 are movable towards each other, cutting the washer 4 as they come together. Preferably, the formations 11 and 12 are cylindrical and extend parallel to the direction of relative movement of the die 2 and press 3.

As shown in FIGS. 4 and 5, in the preferred form of the invention, it is an outer portion 13 of the washer 4 that is broken between the shearing formations 11 and 12 of the upper press 3 and the lower die 2.

After the cutting of the washer 4, the broken washer 4 is retained in the lower die 2. See FIGS. 4 and 5. Removal of the upper press 3 reveals the broken washer 4 showing that the bolt 8 has been tested to a selected predetermined load.

Preferably, an alignment member 14 is used to position the die 2 and press 3 such that their annular cutting surfaces 12 and 11 are in proper alignment. See FIGS. 3 and 22. Preferably, the alignment member 14 takes the form of a hollow cylindrical sleeve. Preferably, the alignment sleeve 14 fits around both the upper press 3 and the lower die 2. The lower die 2 is closely received by the alignment sleeve 14. Preferably, the alignment sleeve 14 is strong enough to help resist any outward deflection of the lower die 2 caused by the compressive pressure on it from the upper press 3. The alignment sleeve 14 could also be used to align the breakable, deformable washer 4, however, in the preferred embodiment the washer 4 is received by the lower die 2 and held in place by an upper recess 15 designed specifically for holding the washer 4 in the correct position.

Preferably, the alignment sleeve 14 is a piece separate from either the die 2 or the press 3 and it receives both. See FIG. 1. Forming the alignment sleeve 14 as a separate member can provide another indication to the operator that the device 1 has been used in the correct manner. The alignment sleeve 14 is designed so that it can rest on the bearing surface 9: its lower surface 16 being flush with the lower surface 17 of the lower die 2. The alignment sleeve 14 is also designed to have a selected height that will place its upper surface 18 flush with or above the upper surface 19 of the upper press 3 when the load-indicating device 1 has been pressed down onto the lower die 2 as far as it will go with a particular washer 4 disposed between the upper press 3 and a lower die 2. Thus, when the operator observes that the upper surface 19 of the upper press 3 is flush with or below the upper surface 18 of the alignment sleeve 14, and a washer 4 of a selected thickness is used, the operator will know to stop turning the nut 10 onto the bolt 8. The alignment sleeve 14 can also be made integral with either the lower die 2 or the upper press 3.

The alignment sleeve 14 is preferably formed with an annular peripheral inset 20 at its lower end. See FIG. 2. This allows levers to be hooked under the sleeve 14, to aid in the removal of the upper press 3 and alignment sleeve 14. See FIG. 4.

The alignment sleeve 14 is also preferably formed with an annular notch 22 on its inner surface 21. See FIG. 1. This notch 22 receives part of a positioning ring 23 that is also preferably received in an annular notch 24 in the outer surface 25 of the upper press 3. The ring 23 is preferably made from spring steel and prevents the alignment sleeve 14 from sliding completely off the upper press 3. The annular notch 22 in the alignment sleeve 14 is preferably just large enough to receive the ring 23, while the annular notch 24 in the upper press 3 is preferably wide enough for the ring 23 to slide up and down on the upper press 3 within the notch 24, allowing the alignment sleeve 14 to slide up and down on the upper press 3. The presence of the ring 23 prevents either of the parts from being lost when not in use.

In the preferred embodiment, because it is desirable to provide tamper resistant evidence that the anchor member 8 has been tested, the deformable washer 4 and the upper press 3 and lower die 2 are formed so that after the washer 4 has been broken by the shearing action of the upper press 3 and lower die 2, portions of the washer 4 can be locked between the anchor member 8 and the annular shearing formation 12 of the lower die 2 by bearing surfaces 26 and 27 in the upper press 3 and lower die 2. See FIGS. 4, 5, 30, 33 and 36. In the preferred embodiment these bearing surfaces 26 and 27 lie inwardly of the shearing formations 11 and 12.

In the preferred form, the breakable, deformable washer 4 is formed with an outer periphery 28 that closely corresponds in dimension and shape to the upper recess 15 in the lower die 2 for holding the washer 4. The washer 4 is also formed with an central aperture 7 that allows the washer 4 to be slipped over the bolt 8. The washer 4 extends inward from the outer periphery 28. See FIG. 1. In the present invention, the term inward is used to describe areas that lie closer to the anchor member 8 than other areas lying along a ray passing through the long axis 29 of the anchor member 8 and lying perpendicular to the long axis 29 of the anchor member 8.

In the preferred embodiment, at some portions along its generally ring-like shape, the washer 4 is only wide enough to present a member appropriate for being sheared by the formations 11 and 12 on the upper press 3 and lower die 2. See FIG. 6. In the preferred embodiment, this is considered the outer portion 13. At other portions along its periphery it extends inwardly and substantially close to the outer surface 30 of the bolt 8, helping to create the ability to achieve a close fit between the outer surface 30 of the bolt 8 and the shearing formation 12 of the lower die 2 after the washer 4 has been sheared.

In other embodiments the division between the outer portion 13 of the washer 4 and the inwardly projecting portion 31 or portions is not so easily defined. For example, the washer 4 shown in FIG. 32 is a simple disc with an aperture 7. In effect it has only one inwardly projecting portion 31, as opposed to distinct tabs 31 extending from the outer portion 13 of the washer 4 as shown, for example, in FIG. 35. If the washer 4 is to be bent or sheared, the outer portion 13 of the washer 4 is where this action takes place.

In the preferred embodiment the inwardly projecting portions 31 are formed as a plurality of distinct tabs 31. See FIGS. 6 and 35. These tabs 31 extend inwardly from the outer portion 13 toward the anchor member 8. The projecting portions 31 also extend at an angle less than ninety degrees to the long axis 29 of the anchor member 8 for a portion of their length. These inwardly and angularly extending projecting portions 31 are formed to be pressed into the anchor member 8 by the cooperating bearing surfaces 26 and 27 of the upper press 3 and the lower die 2.

In the preferred embodiment, in order to improve the ability of the washer 4 to lock itself between the bolt 8 and the shearing formation 12 or surface of the lower die 2, the inwardly projecting portions 31 of the washer 4 are bent at angle less than 90 degrees to the long axis 29 of the anchor member 8. See FIGS. 2 and 2A. Because the inwardly projecting portions 31 start at the outer periphery 28 of the washer 4 which lies outwardly from the shearing surfaces 12 and 11 of the lower die 2 and the upper press 3, and then extend almost to the outer surface 30 of the bolt 8, the bend in the inwardly projecting portions creates a tab 31 or member that is longer than the distance between the shearing formation 12 of the lower die 2 and the outer surface 30 of the anchor member 8 as measured normal to the long axis 29 of the anchor member 8. This too helps to lock the inwardly projecting portions 31 of the washer 4 in place.

In the preferred embodiment, the downwardly and inwardly projecting portions 31 of the disposable washer 4 work in combination with bearing surfaces 26 and 27 on the upper press 3 and lower die 2 to lock the projecting portions 31 into place after the washer 4 has been sheared. These bearing surfaces 26 and 27 lie inwardly from the shearing surfaces 11 and 12, parallel to each other and lie generally normal to the long axis 29 of the bolt 8. After the operator tightens the nut 10 against the upper press 3 onto the bolt 8 sufficiently to shear the washer 4 he will feel the resistance to his turning of the nut 10 drop appreciably. If he then continues to tighten the nut 10 on the bolt 8, he will move the bearing surface 26 on the upper press 3 closer to the bearing surface 27 of the lower die 2. He will continue the pushing of the inwardly projecting portions 31 downward into the main recess 32 of the lower die 2 where more of each of the inwardly projecting portions 31 will encounter the lower bearing surface 27. As the upper press 3 continues to bear down upon the inwardly projecting portions 31, they will be diverted by the lower die bearing surface 27 first towards the threads 33 of the bolt 8, and then as they are resisted by the threads 33 of the bolt 8 towards the shearing formation 12 of the lower die 2. If the operator continues turning the nut 10 until the upper press bearing surface 26 and lower die bearing surface 27 are as close as they can be, the inwardly projecting portions 31 will be driven up against the shearing surface 12 of the lower die 2 and into the outer surface 30 of the anchor member 8, locking the inwardly projecting portions 31 in place. See FIG. 4. Preferably, the anchor member 8 is threaded where the inwardly projecting portions 31 grab the bolt 8, and so the inwardly projection portions 31 are driven between the threads 33. Thus, the inwardly projecting portions 31 are jammed between the shearing surface 12 of the lower die 2 and the outer surface 30 of the anchor member or bolt 8. The inner edges 34 of the inwardly projecting portions 31 bear against the outer surface 30 of the anchor member 8 and the new outer portion of the washer 4 bears against the shearing formation 12 of the lower die 2.

The inwardly projecting portions 31 are preferably formed with long notches 35, extending inwardly from the outer periphery 28 of the washer 4. See FIG. 6. These notches 35 weaken the inwardly projecting portions 31, which allows the inwardly projecting portions 31 to be deformed and driven into the threads 33 of the bolt 8 more easily. Instead of notches 35, slots or openings 36 can be formed in the inwardly projecting portions 31 to weaken them.

In the preferred form, notches 37 are formed to one side of each of the inwardly projecting portions 31, extending outwardly from the inner periphery 38 of the washer 4. See FIG. 6. Specifically the notch 37 is formed between an inwardly projecting portion or tab 31 and one of the adjacent portions of the washer 4, where the washer 4 is only wide enough to be adequately sheared. These notches 37 extend far enough toward the outer periphery 28 of the washer 4, such that they reach to where the shearing surfaces 11 and 12 will break the washer 4 or the shear line 39. See FIG. 24 for a view of the shear line 39. By removing the portions of the washer 4 to the outside of the shear line 39, the connection between adjacent parts of the washer 4 to either side of the notch 37 is lost. The portions of the washer 4 inward of the shear line 39 will be separated from each other after the washer 4 is broken. This, too, helps weaken the washer's resistance to being deformed and pressed into locking engagement with the threads 33 of the bolt 8 and the lower die's shearing surface or formation 12.

While the preferred form is made with four inwardly projecting portions 31 and four corresponding inward notches 37, the number of notches 37 could be manipulated to increase or decrease the washer's resistance to being bent onto the anchor member 8. If only one notch 37 was made in the washer 4, the washer 4 would retain its characteristic ring shape even after it was broken.

In the preferred form the notches 37 for breaking the ring structure of the washer 4 to the inward side of the shear line 39 are disposed next to each inwardly projecting portion or tab 31, but this need not be the case.

Preferably the inwardly projecting portions 31 are formed to extend down to the lower die bearing surface 27 prior to being deformed. Preferably, the inwardly projecting portions 31 make contact with the lower bearing surface 27 before they end close to the outer surface 30 of the anchor member 8, this allows bends to be formed in the inwardly projecting portions 31 to create end flanges 40 in the inwardly projecting portions 31. See FIGS. 2 and 2A. The end flanges 40 run along the lower die bearing surface 27 and extend towards the bolt 8. The end flanges 40 help direct the inwardly projecting portions 31 to extend towards the bolt 8 at first when the shearing and deformation of the washer 4 begins.

The end flanges 40 are formed with an inner edge 34. This inner edge 34 is preferably shaped to fit closely with the arced outer surface 30 of the anchor member 8. See FIG. 22 and FIG. 6.

Preferably, the inwardly projecting portions 31 of the washer 4 of the preferred embodiment taper as they extend towards the anchor member 8. See FIGS. 6 and 7.

Preferably, the inwardly projecting portions 31 of the washer 4 are driven into the threads 33 of the anchor member 8, but they need not be. See FIG. 21.

As it is desirable to make and use a limited number of press 3 and die 2 sets to accommodate a variety of conditions, differing load values for shearing the washer 4 are achieving by varying the shape and thickness of the washer 4. By forming openings 41 in the washer 4 where the shearing formations 11 and 12 on the press 3 and die 2 will shear or bend the washer 4, the resistance of the washer 4 to being sheared or bent is reduced. Furthermore, by increasing the thickness of the washer 4, the resistance to being sheared or bent increases. Thus, one press 3 and die 2 set can be used with a variety of washers 4 to test anchor members 8 at a variety of loads.

While it is true that by varying the shape and thickness of the washer a single press 3 and die 2 set can be used to test a bolt 8 at a variety of different loads, however, it is more common that the need to test at different loads is necessitated by changes in the diameter of the bolts 8 being used. Generally, different sized bolts 8 are designed for different loads and thus need to be tested at different loads. Since the inwardly projecting portions 31 of the washer 4 need to extend close to the outer surface 30 of the anchor member, preferably to get very accurate predetermined loads, each different anchor member diameter requires its own washer, or washers if it is to be tested at different loads.

Deformation of the inwardly projecting portions 31 can take place before the washer 4 is completely sheared. When this occurs, the spacing of the inwardly projecting portions 31 from the outer surface 30 of the bolt 8 can be important in ensuring that the shearing force is achieved at a particular load. If the inwardly projecting portions 31 are formed too close to the anchor member 8, they will start to press on the anchor member 8 too soon, creating additional resistance to the downward movement of the upper press 3. On the other hand, if the inwardly extending projections 31 are formed too far away from the outer surface 30 of the bolt 8 they cannot properly lock with the bolt or anchor member 8. Furthermore, because it is necessary for the bearing surfaces 26 and 27 of the upper press 3 and the lower die 2 to direct the inwardly projecting portions 31 to lock onto the threads 33 they too must extend close to the outer surface 30 of the bolt 8. Thus each different bolt diameter should also require its own upper press 3 and lower die 2 to predictably get load values within a very specific range.

Since, in the preferred form, the lower die 2 is disposable like the washer 4 and the disposable washer 4 comes inset in the lower die 2, it is a simple matter to make different sized dies 2 for each size bolt 8. However, since it is intended that the upper press 3 be reused in the preferred form, the upper press 3 is designed to be used with a variety of bolt diameters. This is accomplished by using the upper press 3 in combination with a sizing sleeve 42. The upper press 3 is formed with an internal bore 6 having a shoulder 43 that receives a variety of sizing sleeves 42 each with a similar external diameter and a similar external shoulder 44 that fits into the bore 6 and shoulder 43 of the upper press 3. See FIGS. 16, 17, 18 and 19. The sizing sleeves 42 differ from each other in terms of their internal apertures 45. Each has an internal aperture 45 designed to closely receive a particular anchor member 8 of a given diameter. Each sizing sleeve 42, when fitted into the upper press 3 has an upper surface 46 that lies flush with the upper surface 19 of the upper press 3 and a lower bearing surface 47 that lies flush with the bearing surface 26 of the upper press 3. The lower bearing surface 47 of the sleeve 42 in combination with the bearing surface 26 of the upper press 3 creates an upper press bearing surface 26 that extends from the shearing surface 11 of the upper press 3 to close to the outer surface 30 of the particular bolt 8 received. An upper washer 48 that overlays either portions or all of both the upper surface 46 of the sizing sleeve 42 and the upper surface 19 of the upper press 3 can be used to move the sizing sleeve 42 and upper press 3 down in unison, although such is not necessary.

Since it is expected that the load-indicating device 1 of the present invention will commonly be used to test anchor bolts 8 secured to a concrete member 49 by means of epoxy 50, it is desirable to form the lower die 2 with an outer diameter sufficient to extend beyond the largest opening commonly used to receive an anchor bolt 8 that is to be secured by epoxy 50 and tested with a load-indicating device 1. Further, as shown in FIG. 2A, it will be desirable to form a scallop 51 in the lower surface 17 of the lower die 2 such that the lower surface 17 of the lower die 2 only bears upon the concrete member 49 or epoxy 50 that has spilled out of the opening and thinly covers the concrete 49. Generally, the operator will chip away any excess epoxy 50 that spills out onto the upper bearing surface 9 of the concrete or cementitious member 49, however, some epoxy 50 residue is generally left on the bolt 8 above the bearing surface 9 of the concrete member 49.

The inventive method of testing a bolt 8 embedded in a cementitious member 49, according to the preferred embodiment, is practiced in the following manner. A bolt or anchor member 8 attached to a cementitious member 49 is selected to be tested. If for some reason a bearing plate 52 is needed to distribute the load that will be applied to the cementitious member 49 or some other member resting on the cementitious member 49, such as a mudsill 53, near or around the bolt 8, a bearing plate 52 can be slipped over the bolt 8. See FIGS. 1, 2, and 20. The bearing plate 52 should be designed with an internal aperture or notch 54 for receiving the bolt 8 that is wider than the anchor member 8 but narrower than the lower die 2. The aperture or notch 54 in the bearing plate 52 should be wide enough to accommodate the normal amount of epoxy 50 that may adhere to the threads 33 of the bolt 8 above the surface of the epoxy 50 and the concrete 49.

Next the lower die 2 and disposable washer 4 are slipped over the bolt 8, preferably as a unit. See FIG. 2. Next the sleeve 42 suitable for the particular anchor bolt 8 to be tested is fitted in the upper press 3, and the upper press 3 is sipped over the bolt 8, preferably with the alignment sleeve 14. The lower die 2 is received in the alignment sleeve 14, aligning the shearing formations 11 and 12 in the upper press 3 and lower die 2. At this point, the alignment sleeve 14 should rest on the bearing surface 9 and its upper surface 18 should be below the upper surface 19 of the upper press 3. A washer 4 is slipped over the bolt 8 so that it rests on the upper press 3 and the sizing sleeve 42. A nut 10 is then threaded onto the bolt 8, and tightened down so that it comes into contact with upper washer 48 on the load indicating device 1. Torque is continuously applied to the nut 10 until the disposable washer 4 is sheared. This is designed to occur at a predetermined compressive force on the washer 4. The shearing of the washer 4 signifies that the washer 4 has been subjected to a selected compressive force, but more importantly it signifies that the bolt 8 has been subjected to a tension force of equal magnitude.

After the operator shears the washer 4, he should notice that the resistance to tightening the nut 10 decreases dramatically. If he then keeps tightening the nut 10 onto the bolt 8 until significant resistance is encountered the inwardly projecting portions 31 of the washer 4 will be locked in between the threads 33 of the bolt 8 and the shearing surface 12 of the lower die 2, creating a tamper resistant indicator that the bolt 8 has been subjected to a selected tension load. With selected disposable washers 4 the operator will also know that he has tightened the nut 10 as far down as necessary when the upper surface 19 of the upper press 3, aligns with the upper surface 18 of the alignment sleeve 14 or lies below it. See FIG. 4.

The operator then backs off the nut 10, removes the upper washer 48 and the upper press 3, revealing the broken washer 4 with its inwardly projecting portions 31 locked into the main recess 32 of the lower die 2. See FIG. 5. As long as the lower die 2 remains undisturbed the inwardly projecting portions 31 will remain locked in place.

An inspector can then come and examine the washer 4 and lower die 2. If the inwardly projecting portions 31 are locked between the threads 33 and the shearing surface 12 of the lower die 2, he will know that the bolt 8 has been tested. The inspector can confirm this by lightly trying to twist the lower die 2. If the lower die 2 resists being lightly twisted the washer 4 is locked in place around the anchor member 8. Identifying indicia can be placed on either the disposable washer 4 or the lower die 2 or both to aide the inspector in knowing what minimum tension load was applied to the bolt 8 in the process of shearing the washer 4. For example, the washers 4 could be different colors to differentiate between them or could be enscribed, stamped or etched.

As it is believed in the preferred embodiment that it would not be possible to lock the inwardly projection portions 31 of the washer 4 in place without first shearing the washer 4 in the proper manner on the bolt 8 on which the inwardly projecting portions 31 are to be locked, it is believed that it is not possible to have improperly tested a bolt 8 where the inwardly projecting portions 31 are locked in place. Thus, if an inspector encounters a broken washer 4 and lower die 2 where the washer 4 is not tightly locked in place he can know that only one of three things has happened. First, it might be that the particular bolt 8 was not actually tested. Second, it may be that the bolt 8 was tested, but the operator failed to continue turning the nut 10 after the washer 4 was sheared. Third, it may be that the bolt 8 was properly tested, but the bolt 8 and load indicating device 1 were disturbed after the test was completed. No matter which of the three actually occurred, it is expected that the examiner will assume that the bolt 8 was not properly tested and require that it be tested again.

Since it is a relatively simple and fast procedure, so long as the operator has another load-indicating device 1 available, it should not be particularly burdensome for the operator to re-perform the test.

As described above, the purpose of the device 1 is to test whether a selected anchor member 8 is securely attached to its anchorage such that it can resist a selected tension force without the attachment failing. One proposed application for the preferred embodiment is to test the ability of threaded rods or bolts 8 embedded in building foundations 49 by means of epoxy 50 to resist pull-out forces.

The disposable washer 4 is a critical element of the invention. In the preferred embodiment, a washer 4 made from 14 gauge galvanized sheet steel is an appropriate material to be used in testing whether an anchorage can resist a 4,000 pound tension force. The margin of error at this load is approximately plus or minus 5%. The error margin is mostly attributable to variations in the grade of the sheet steel used to make the disposable washers 4. Preferably, the 14 gauge galvanized sheet steel meets ASTM A653-97-SS Grade 33 specifications with a minimum yield strength of 42.8 ksi and a minimum tensile strength of 54.1 ksi, and an elongation index of 37.

12 gauge galvanized sheet steel is an appropriate material to be used in testing whether an anchorage can resist up to 19,000 pounds of tension force. Again the margin of error between tests is expected to be about 5% at this load. Preferably, the 12 gauge galvanized sheet steel meets ASTM-A653-97-SS Grade 33 standards with a minimum yield strength of 39.9 ksi and a minimum tensile strength of 54.3 ksi, and an elongation index of 40. Preferably, the washers 4 are made in a progressive die, and stamped from coiled sheet steel. They can also be milled or made on a wire electrical discharge machine, which is preferred over milling.

FIGS. 6, 7, 8 and 9 show four different washers 4 to be used on four different sizes of threaded bolt 8 to test whether those bolts 8, when anchored, can resist a 4,000 pound tension force. In the light-frame building industry it is common to use threaded anchor members 8 that are ½", ⅝" ¾" and ⅞" inches in diameter. The figures represent washers 4 for each of these sizes with FIG. 6 representing the design of a washer 4 appropriate for a ½" anchor bolt 8, FIG. 7 representing a washer 4 appropriate for a ⅝" anchor bolt 8, and FIGS. 8 and 9 representing washers 4 appropriate for ¾" and ⅞" anchor members 8, respectively. The only difference between the four washers 4 shown in FIGS. 6, 7, 8 and 9 is the length of the inwardly projecting portions 31. In FIG. 6, the inwardly projecting portions 31 extend the farthest toward the center of the washer 4. This allows the inner edges 34 of the inwardly projecting portions 31 to be close to the relatively small anchor bolt 8. In FIG. 9, the inwardly projecting portions 31 extend only a short distance towards the center of the washer 4, since a relatively large anchor bolt 8 is used.

FIG. 11 represents the design of a washer 4 appropriate for a ½" anchor bolt 8 to be tested to 7,500 pounds in tension with a 5% margin of error. The washer 4 in FIG. 11 is made from 14 gauge galvanized sheet steel.

FIG. 10 represents the design of a washer 4 appropriate for a ⅝" anchor bolt 8 to be tested to 11,750 pounds in tension with a 5% margin of error. The washer 4 in FIG. 10 is made from 14 gauge galvanized sheet steel.

FIG. 12 represents the design of a washer 4 appropriate for a ⅞" anchor bolt 8 to be tested to 19,000 pounds in tension with a 5% margin of error. The washer 4 in FIG. 13 is made from 12 gauge galvanized sheet metal.

FIG. 13 represents the design of a washer 4 appropriate for a ¾" anchor bolt 8 to be tested to 16,920 pounds in tension with a 5% margin of error. The washer 4 in FIG. 13 is made from 12 gauge galvanized sheet metal.

The upper press 3, lower die 2, alignment sleeve 14 and sizing sleeves 42 are preferably machined on a lathe. In the preferred embodiment, the upper press 3 is machined from heat treated AISI S7 tool steel formed as a round bar (also known as DCF S7 tool steel RD) with a Rockwell index of 57 to 60.

An appropriate material for making the alignment sleeve 14, in the preferred embodiment, is CD 4130 steel with a Rockwell index of 40 to 46 that comes as a tubular member. The ring or circlet 23 for attaching the alignment sleeve 14 to the upper press 3 is preferably heat treated spring steel.

In the preferred embodiment, the inner sizing sleeves 42 are preferably formed from TG&P 4140/42 HT steel that comes as a round bar. It is preferred that the inner sleeves 42 be relatively soft, to preserve the integrity of the upper press 3.

In the preferred embodiment, TG&P 4140/42 HT steel shaped as a 2" round bar is the preferred material for making the lower die 2. It is desirable that the lower die 2 be relatively soft compared to the upper press 3. TG&P 4140/42 HT steel is relatively soft, and yet does not expand or change its shape under the pressures and working conditions anticipated for use in testing anchor bolts 8 embedded in foundations 49 for light frame construction.

FIGS. 23 and 24 show a washer 4 different from the washers 4 shown in FIGS. 6 through 13 in two important respects. First the washer 4 shown in FIGS. 23 and 24 is made with weakening slots 36 in the inwardly projecting portions 31 rather than notches 35. These weakening slots 36 work in a similar fashion as the weakening notches 35. Just like the weakening notches 35, the weakening slots 36 allow the inwardly projecting portions 31 to be more easily deformed and driven onto the anchor member 8.

Second, the washer 4 shown in FIGS. 23 and 24 does not have any notches 37 that extend from the inner periphery 38 of the washer 4 that cross the shear line 39 of the washer 4. This means that when the washer 4 is sheared by the shearing formations 11 and 12, the remaining inner portion will not be separated along a radial line, but will remain an intact ring attached to the anchor member 8. This affects how the washer 4 serves to indicate that the bolt 8 has been tested, when used with a modified lower die 2.

The modified lower die 2 is made as two pieces. If the washer 4 of FIGS. 23 and 24 is used with a lower die 2 made from two pieces, after the bolt 8 has been tested and after the upper press 3 and the alignment sleeve 14 have been removed, the lower die 2 can also be removed leaving the washer 4 attached to the anchor member 8 by itself. In this embodiment, since the lower die 2 is not needed after the testing of the device to maintain the broken washer's position on the anchor member 8, the lower die 2 can be reused again along with the upper press 3 to test the next anchor member 8. The sheared washer 4 attached to the anchor member 8 serves as a tamper resistant indicator that the anchor member or bolt 8 has been tested in the proper manner.

Sometimes it may be necessary to take additional steps to ensure that the anchor member 8 is tested in the proper manner. A piece of friction tape or other similar tape is wound around the anchor member 8 in the area where the washer 4 will attach to the anchor member 8. This is done prior to testing. In testing the anchor member or bolt 8, the washer 4 is squeezed onto the anchor member 8, cutting through the tape. The tape above and below where the washer 4 grabs the bolt 8 is unmarred. Were someone to try to remove the washer 4 from the anchor member 8, the tape would be marred, providing evidence that the washer 4 was tampered with after the test.

Furthermore, were someone to try to attach a washer 4 without going through the process of testing the anchor member 8, the tape would likely evidence this as well.

The use of friction tape is especially helpful when using the washer 4 of FIGS. 23 and 24. This is because this particular washer 4 retains its shape as an intact ring even after it has been broken by the shearing formations 11 and 12. Because it retains its structural integrity as a ring, it is not so fragile that it cannot be manipulated or threaded onto or off of the bolt 8 as with the preferred embodiment. Thus there are more opportunities to try to thwart the testing procedure or tamper with the evidence of a test, thus the added security can be desirable.

Under the present invention, it is also possible to test an anchor member's resistance to pull-out loads and indicate that it has been tested in a tamper resistant manner without shearing the washer 4. One such alternate embodiment of the present invention is shown in FIGS. 27, 28, 29 and 30.

FIG. 27 shows the disposable washer 104, in this embodiment it is preferably formed as two pieces 155 and 156. The pieces 155 and 156 of the disposable washer 104 fit into the lower die 102 shown in FIG. 28. The pieces are two c-shaped members 155 and 156, preferably formed from aluminum. Preferably, the c-shaped pieces 155 and 156 have top and bottom surfaces 157 and 158 that are generally flat and generally parallel to each other, such that the c-shaped pieces 155 and 156 have a generally planar or flat form.

It is not important that the top and bottom surfaces 157 and 158 are generally flat, rather it is important that the top and bottom surfaces 157 and 158 conform to the shape of the bearing surfaces 126 and 127. One of the c-shaped pieces 156 is preferably formed with a flange 159 extending from its convex side 160. The concave sides 161 of the c-shaped pieces 155 and 156 are designed to closely receive the anchor member 8 when the c-shaped pieces 155 and 156 are fitted into the main recess 132 of the lower die 102.

The lower die 102 is formed as a generally cylindrical member. The lower die 102 is formed with an aperture 105 for receiving an anchor member 108 therethrough. The aperture 105 should be formed to closely receive the anchor member 108, and is generally milled with the same diameter as the anchor member 108, so that it can fit over the anchor member 108 with a sliding fit.

The lower die 102 is also formed with a main recess 132 into which the pieces 155 and 156 of the disposable washer 104 fit. The convex sides 160 of the c-shaped pieces 155 and 156 should conform to the shape of the main recess 132, such that there is a close fit between the c-shaped pieces 155 and 156 and the main recess 132. The outer rim 162 of the lower die 102 is formed with a notch 163 that can receive the flange 159 of the c-shaped piece 156. The outer rim 162 rises upwardly from the bearing surface 127. The outer rim 162 has a side wall 164 against which the washer 104 can push. The bottom or bearing surface 127 of the recess 132 is generally flat. It is the bearing surface 127 of the lower die 102. While it is generally flat in the preferred form, it is disturbed by an annular compression ridge 165. Preferably, the center of the annular ridge 165 is the center of the aperture 105. Preferably, the annular compression ridge 165 is disposed near the aperture 105 in the lower die 102.

Preferably, the recess 132 in the lower die 102, as measured from the bottom of the recess 127 to the top of the rim 162, should be deep enough to accommodate the width of the disposable washer 104. See FIG. 30. The annular compression ridge 165 is high enough to lift the upper surfaces 157 of the c-shaped pieces 155 and 156 above the rim 162 of the lower die 102, when the c-shaped pieces 155 and 156 are in their uncompressed original form.

The upper press 103 is also formed as a generally cylindrical member with an aperture 106 for closely receiving an anchor member 108. See FIGS. 29 and 30. The bearing surface 126 of the upper press 103 is generally flat, however, it is also interrupted by an annular compression ridge 166. Preferably, the bottom surface 126 of the upper press is the bearing surface. Preferably, the center of the annular compression ridge 166 is the center of the aperture 106 in the upper press 103. The annular compression ridge 166 of the upper press 103 will be in general alignment with the annular compression ridge 165 of the lower die 102 when the two are slipped onto the anchor member 108.

When the upper press 103 and the lower die 102 are compressed towards each other by the action of a nut 110 being turned onto the anchor member 108, they squeeze the disposable washer 104 between them. The annular compression ridges 165 and 166 are driven into the upper and lower surfaces 157 and 158 of the c-shaped pieces 155 and 156. This displaces the metal of the disposable c-shaped pieces 155 and 156. The metal will want to flow outwardly from the annular compression ridges 165 and 166 and inwardly toward the anchor member 108. The material of the lower die 102 should be strong enough to resist this outward displacement of the material, such that material flow of the metal of the c-shaped pieces 155 and 156 toward the anchor member 108 will be encouraged. See FIG. 30.

The width of the c-shaped pieces 155 and 156, the material content of the members, the shape and dimension of the concave and convex sides 160 and 161 of the c-shaped pieces 155 and 156, and the height of the rim 162 of the lower die 102 all effect the design test load for the load testing device 101. These are all selected so that when the bearing surface 126 of the upper press 103 reaches the rim 162 of the lower die 102, the user will know that the disposable washer 104 has been subjected to selected compression force, and that the c-shaped pieces 155 and 156 have locked themselves between the anchor member 108 and the side wall of the rim 162, as shown in FIG. 30.

The load testing device 101 and disposable washer 104 are removed from the anchor member 108 by backing off the nut 110, removing the upper press 103 and using a lever to pop the flanged, c-shaped piece 156 out of the main recess 132 of the lower die 102. When the device 101 has been tested to its designed load, the c-shaped pieces 155 and 156 will have been locked between the side wall 164 of the rim 162 of the lower die 102 and the outer surface 130 of the anchor member 108, and indentations will have been formed in the disposable washer 104 such that the washer 104 has been pushed far enough into the main recess 132 for the bearing surface 126 of the upper press 103 to reach the rim 162 of the lower die 102.

Another possible embodiment for testing an anchor member's resistance to pull-out loads and indicating that it has been tested in a tamper resistant manner without shearing the washer 204 is shown in FIGS. 34 through 36.

FIGS. 34 and 35 show the disposable washer 204. In this embodiment, it is preferably formed in a manner similar to the washers 4 of the preferred embodiment. That is to say it has inwardly projecting portions 231 that bend downwardly toward the lower die 202. The inwardly projecting portions 231 are also preferably formed with end flanges 240 that direct the inner edges 234 of the inwardly projecting portions 231 toward the outer surface 230 of the anchor member 208, when the washer 204 is compressed.

The lower die 202, shown in FIG. 36, is formed as a generally cylindrical member. The lower die 202 is formed with an aperture 205 for receiving an anchor member 208 therethrough. The aperture 205 in the lower die 202 should be formed to closely receive the anchor member 208. The lower die 202 is not as wide as the washer 204. It has a bearing surface 227 on which the washer 204 rests. The washer 204 overhangs the lower die 202.

The upper press 203 is also formed as a generally cylindrical member with an aperture 206 for closely receiving an anchor member 208.

The upper press 203 is formed with an annular bending recess 267 with a bearing surface 226. The diameter of the washer 204 is larger than the diameter of the recess 267, and the diameter of the recess 267 is larger than the diameter of the bearing surface 227 of the lower die 202. Preferably, the bending recess 267 is larger than the bearing surface 227 of the lower die 202 by two thicknesses of the washer 204.

When the upper press 203 and the lower die 202 are compressed towards each other by the action of a nut 210 being turned onto the threads 233 of the anchor member 208, they squeeze the disposable washer 204 between them. The washer 204 is driven into the bending recess 267 of the upper press 203. In so doing, the inwardly projecting portions 231 of the washer 204 are straightened and forced toward the outer surface 230 of the anchor member 208. This displaces the metal of the disposable washer 204. At the same time the outer portions 213 of the washer member 204 are bent over the lip 268 of the lower die 202. This lip 268 is preferably rounded.

The width of the washer 204, the material content of the members, the clearance between the lip 268 of the lower die 202 and the side wall 269 of the recess 267 in the upper press 203, and the shape and dimensions of the washer 204 effect the load at which the inwardly projecting portions 231 are locked onto the anchor member 208 and the outer portion 213 of the washer 204 are bent. The user can turn the nut 210 on the threaded bolt 208, until the lowest point of the upper press 203 reaches a certain point on the lower die 202, and then he will know that the anchor member 208 has been subjected to the selected tension load.

The bent outer portion 213 of the washer 204 indicates to the inspector that the design load has been reached. The locking of the washer 204 onto the anchor member 208 and between the anchor member 208 and the side wall 269 of the upper press bending recess 267 indicates that the device 201 has not been tampered with since it has been tested and also indicates that the test was conducted in the proper manner.

The load testing device 201 and disposable washer 204 are removed from the anchor member 208 by backing off the nut 210, and removing the upper press 203 with a lever. When the device 201 has been tested to its designed load, the washer 204 will have been locked between side wall 269 of the recess 267 of the upper press 203 and the outer surface 230 of the anchor member 208.

The annular compression ridges 165 and 166 of the load indicating device 101 shown in FIGS. 27, 28, 29 and 30 can also be combined with the shearing formations 11 and 12 of the preferred embodiment to create a load testing device 301. Such a device 301 is shown in FIGS. 31 through 33. In this embodiment, the means for manipulating the washer 304 on the upper press 303 is a shearing formation 311 and a bearing surface 326 with a compression ridge 366, with the bearing surface 326 lying inwardly of the shearing formation 311. In this embodiment, the means for manipulating the washer 304 on the lower die 302 is a shearing formation 312 formed to cooperate with the shearing formation 311 of the upper press 303 and a bearing surface 327, having a compression ridge 365 formed to cooperate with the compression ridge 366 of the upper press 303.

FIGS. 31 and 32 show the disposable washer 304 used in this embodiment. In this embodiment it is preferably a simple circular, flat member with a circular aperture 307. The circular aperture 307 is designed to closely receive a circular anchor member 308. The washer 304 is shown in cross section in FIG. 31 and in a plan view in FIG. 32. Instead of being formed with a circular aperture 307, the inner aperture 307 could be notched so that some portions of the inner aperture 307 did not lie as close to the outer surface 330 of the anchor member 308. This might be done to make it more easy to deform the washer 304. Notches could also be placed along the outer periphery 328 that extend to the shear line or openings could be place in the washer member at the shear line or inwardly from the shear line.

Preferably, the washer 304 has top and bottom surfaces 357 and 358 that are generally flat and generally parallel to each other. It is not important that the top and bottom surfaces 357 and 358 of the washer 304 are generally flat, rather it is important that the top and bottom surfaces 357 and 358 conform to the shape of the bearing surfaces 326 and 327.

The lower die 302 is formed as a primarily cylindrical member. The lower die 302 is formed with an aperture 305 for receiving an anchor member 308 therethrough. The aperture 305 should be formed to closely receive the anchor member 308.

The uppermost surface of the lower die 302 is generally flat, and is the bearing surface 327. The diameter of the washer member 304 is larger than the diameter of the bearing surface 327 of the lower die 302, such that the washer 304 overhangs the bearing surface 327. The bearing surface 327 falls off at an annular shearing formation 312.

The annular shearing formation 312 is preferably parallel to the long axis 329 of the anchor member 308, however, it need not be. The shearing formation 312 ends in a shoulder 370 that extends to the annular outer periphery of the lower die 302. The annular outer periphery is designed to be closely received by an alignment sleeve 314.

While the bearing surface 327 is generally flat in its preferred form, it is disturbed by an annular compression ridge 365. The center of the annular compression ridge 365 is preferably the center of the aperture 305. Preferably, the annular compression ridge 365 is disposed near the aperture 305 in the lower die 302.

The upper press 303 is also formed as a generally cylindrical member with an aperture 306 for closely receiving an anchor member 308.

The upper press 303 is formed with a generally flat bearing surface 326, however, it is also interrupted by an annular compression ridge 366. Preferably, the center of the annular compression ridge 366 is the center of the aperture 306 in the upper press 303. The annular compression ridge 366 of the upper press 303 will be in general alignment with the annular compression ridge 365 of the lower die 302, when the two are slipped onto the anchor member 308. The bearing surface 326 ends at the shearing formation 311 of the upper press 303 that conforms with and nests with the shearing formation 312 of the lower die 302. The outer surface 325 of the upper press 303 is also formed to nest within the alignment sleeve 314.

When the upper press 303 and the lower die 302 are compressed toward each other by the action of a nut 310 being turned onto the anchor member 308, they squeeze the disposable washer 304 between them.

At first the only action on the disposable washer 304 is a shearing force generated by the shearing formations 311 and 312. This action continues until the outer portion 313 of the washer 304 is sheared off. For a moment the resistance backs off, and then resistance to the turning of the nut 310 increases again as the bearing surfaces 326 and 327 of the upper press 303 and lower die 302 start to compress the washer 304.

The annular compression ridges 365 and 366 are driven into the upper and lower surfaces 357 and 358 of the washer 304. This displaces the metal of the disposable washer 304. The metal of the washer member 304 will want to flow outwardly from the annular compression ridges 365 and 366 and inwardly toward the anchor member 308. The material of the upper press 303 should be strong enough to resist this outward displacement of the material, such that material flow of the metal of the washer 304 toward the anchor member 308 will be encouraged.

The width of the washer member 304, the material content of the members, the shape and dimension of the inner periphery 338 of the washer 304, the presence of openings or notches in the washer member, their placement, and the shape and placement of shearing formations 311 and 312 all effect the design test load for the device 301.

The shearing action is used to subject the anchor member 308 to a selected tension load. The compression of the washer 304 between the bearing surfaces 326 and 327 and the annular compression ridges 365 and 366 locks the washer 304 between the anchor member 308 and the shearing formation 311 of the upper press 303.

The load testing device 301 and disposable washer 304 are removed from the anchor member 308 by backing off the nut 310, removing the alignment sleeve 314 and using a lever to pop the upper press 303 and washer 304 off of the lower die 302.

The load testing devices of the present invention have been described and shown as being used with an elongated anchor member 8, having a circular cross-section and threaded upper portion. Currently, these are common characteristics of anchor members 8 where the inventors have identified a need for such a testing device.

The load testing devices described above utilize the threaded, cylindrical anchor members 8 to help generate the compressive force to break and/or deform the disposable washer 4 and to create the equal but opposite tension load on the anchor member 8 connected to a securing member. Specifically, a nut 10 is threaded onto the anchor member to create the compressive force.

It is also possible that the upper press could threadably receive the anchor member, and it could be turned down onto the lower die to shear and/or deform the washer, although this is not preferred.

The load testing devices could be used on other anchor members having different cross-sections. The apertures in the washer members, the lower die and the upper press would have to be changed to accommodate the different shaped anchor members. This is necessary to preserve a close fit so that the inward peripheral edge or edges of the disposable washer near the outer surface of the anchor member are directed toward and wedge themselves into the outer surface of the anchor member.

The shearing formations and compression ridges on the upper press and lower die could be changed from the annular forms shown, however, such a change is not necessitated by the use of a non-cylindrical anchor member.

As described above a typical nut sized to receive the threads of the anchor member is used to compress the load testing device. However, such may not be the case if a non-cylindrical, or a non-threaded anchor member is used.

In such a case, a special jack might be used that could grip the top of the anchor member and push a piston type member against the load testing device with equal pressure over the upper surface of the upper press. Such a device would work like a nut, creating a compression force on the load unit device and an equal but opposite tension force on the anchor member.

It is also to be noted that while each embodiment of the load unit testing device has been described as having an upper press and a lower die, the members could be switched and the units could still function. The only change that would need to be made is that where the lower units are scalloped to allow for epoxy that lies above the plane of the cementitious member, what was the upper member would need to have a similar scallop.

While the direct tension indicator has been shown being used to test an anchor member embedded in a cementitious member, it is not limited to this particular application. For example, the direct tension indicator could be used to test the weld 71 attaching an anchor member to a steel plate 72, as shown in FIG. 25.

We claim:

1. A device for indicating attainment of a predetermined compressive load applied to said device, said device being formed to receive an anchor member upon which a tensioning force is to be applied in conjunction with loading said device, said device comprising:

a. an upper press, having an aperture formed to receive said anchor member and also having means for manipulating a washer;

b. a lower die, having an aperture formed to receive said anchor member, said lower die formed so as to be able to work in conjunction with said upper press when said upper press and lower die are aligned and moved towards each other, said lower die also having means for manipulating said washer, said means for manipulating said washer being formed to cooperate with said means for manipulating said washer on said upper press; and c. said washer lying between said upper press and said lower die, said washer being formed so that when said washer is acted upon by said means for manipulating said washer of said upper press and said lower die it will indicate visually whether a selected compression load has been applied to said washer, said washer member also having one or more inner portions that are formed so that when said washer is acted upon by said means for manipulating said washer, said one or more inner portions can extend inwardly toward said anchor member and can be pressed into said anchor member.

2. The device of claim 1, wherein:

a. said means for manipulating said washer on said upper die comprises a shearing formation and a bearing surface lying inwardly of said shearing formation;

b. said means for manipulating said washer on said lower die comprises a shearing formation formed to cooperate with said shearing formation of said upper press, and a bearing surface formed to cooperate with said bearing surface of said upper press; and c. said washer being formed with an outer portion that can be broken between said shearing formations of said upper press and said lower die, said washer also having one or more projecting portions that extend inwardly from said outer portion toward said anchor member received by said lower die, said one or more projecting portions also extending at an angle less than ninety degrees to said long axis of said anchor member for a portion of their length, said inwardly and angularly extending one or more projecting portions of said washer being formed to be pressed into said anchor member by said cooperating bearing surfaces of said upper press and said lower die.

3. The device of claim 2, further comprising an alignment member for aligning said upper press and said lower die.

4. The device of claim 1, wherein:

a. said means for manipulating said washer on said upper die comprises a bearing surface and a compression ridge on said bearing surface; and b. said means for manipulating said washer on said lower die comprises a compression ridge on a bearing surface formed to cooperate with said compression ridge of said upper press and said bearing surface formed to cooperate with said bearing surface of said upper press.

5. The device of claim 4, wherein said means for manipulating said washer on said lower die further comprises an outer rim rising upwardly from said bearing surface, said outer rim having a side wall against which said washer member can push.

6. The device of claim 4, wherein said means for manipulating said washer on said upper die further comprises an outer rim depending from said bearing surface, said outer rim having a side wall against which said washer member can push.

7. The device of claim 1, wherein:

a. said means for manipulating said washer on said upper die comprises a shearing formation and a bearing surface with a compression ridge, said bearing surface lying inwardly of said shearing formation; and b. said means for manipulating said washer on said lower die comprises a shearing formation formed to cooperate with said shearing formation of said upper press, and a bearing surface, having a compression ridge formed to cooperate with said bearing surface of said upper press.

8. The device of claim 7 further comprising an alignment member for aligning said upper press and said lower die.

9. The device of claim 1, wherein:

a. said means for manipulating said washer on said upper press comprises a bending recess with a bearing surface;

b. said means for manipulating said washer on said lower die comprises a bearing surface formed to cooperate with and nest within said bearing recess of said upper press; and c. said washer being formed with an outer portion that is bent around said lower die by said bending recess, said washer also having one or more projecting portions that extend inwardly from said outer portion toward said anchor member received by said lower die, said one or more projecting portions also extending at an angle less than ninety degrees to said long axis of said anchor member for a portion of their length, said inwardly and angularly extending one or more projecting portions of said washer being formed to be pressed into said anchor member by said cooperating bearing surfaces of said upper press and said lower die.

10. The device of claim 1, wherein:

a. said means for manipulating said washer on said lower die comprises a bending recess with a bearing surface;

b. said means for manipulating said washer on said upper press comprises a bearing surface formed to cooperate with and nest within said bearing recess of said lower die; and c. said washer being formed with an outer portion that is bent around said upper press by said bending recess, said washer also having one or more projecting portions that extend inwardly from said outer portion toward said anchor member received by said lower die, said one or more projecting portions also extending at an angle less than ninety degrees to said long axis of said anchor member for a portion of their length, said inwardly and angularly extending one or more projecting portions of said washer being formed to be pressed into said anchor member by said cooperating bearing surfaces of said upper press and said lower die.

11. A device for indicating attainment of a predetermined compressive load applied to said device, said device being formed to receive an anchor member upon which a tensioning force is to be applied in conjunction with loading said device, said anchor member having a long axis and an outer surface, said device comprising:

a. an upper press, having an aperture formed to receive said anchor member, said upper press also having a shearing formation and a bearing surface lying inwardly of said shearing formation;

b. a lower die, having an aperture formed to receive said anchor member, said lower die formed so as to be able to nest with said upper press when said upper press and lower die are aligned and moved towards each other, said lower die also having a shearing formation formed to cooperate with said shearing formation of said upper press, and a bearing surface formed to cooperate with said bearing surface of said upper press; and c. a washer lying between said upper press and said lower die, said washer being formed so as to have an outer portion that can be broken between said shearing formations of said upper press and said lower die, said washer also having one or more projecting portions that extend inwardly from said outer portion toward said anchor member received by said lower die, said one or more projecting portions also extending at an angle less than ninety degrees to said long axis of said anchor member for a portion of their length, said inwardly and angularly extending one or more projecting portions of said washer being formed to be pressed into said anchor member by said cooperating bearing surfaces of said upper press and said lower die.

12. The device of claim 11, wherein one or more weakening notches are formed in one or more of said inwardly projecting portions of said washer.

13. The device of claim 11, wherein one or more weakening openings are formed in one or more of said inwardly projecting portions of said washer.

14. The device of claim 11, wherein end flanges are formed in the inwardly projecting portions of the washer, said end flanges lying substantially perpendicular to said long axis of said anchor member.

15. The device of claim 11, wherein weakening notches are formed in the outer portion of the washer, said weakening notches extending from the inward side of said outer portion to a point where said shearing formations will break said washer.

16. The device of claim 11, further comprising an alignment member for aligning said upper press and said lower die.

17. The device of claim 11, wherein said washers is received in an upper recess in said lower die before it is broken.

18. The device of claim 11, wherein said lower die is formed with a scallop for accommodating epoxy or other materials joined to said anchor member.

19. The device of claim 11, further comprising a bearing plate.

20. The device of claim 19, wherein said bearing plate is formed as a u-shaped member.

21. The device of claim 19, wherein said anchor member is connected to a cementitious member, and a wood member is disposed between said cementitious member and said bearing plate.

22. An apparatus for applying a tension load to an anchor member connected to a steel member, said apparatus comprising:
   a. said anchor member having threads;
   b. said steel member being adhesively bonded to said anchor member;
   c. a lower die, having an aperture receiving said anchor member, said lower die also having a shearing formation;
   d. an upper press, having an aperture receiving said anchor member, said upper press formed so as to be able to nest with said lower die when said upper press and said lower die are aligned and moved towards each other, said upper press also having a shearing formation formed to cooperate with said shearing formation of said lower die;
   e. a washer lying between said upper press and said lower die also receiving said anchor member, said washer being formed so as to have portions that can be broken between said shearing formations of said upper press and said lower die; and
   f. a nut attached to said threads of said anchor member.

23. An apparatus for applying a tension load to an anchor member held in a cementitious member by means of an adhesive member, said apparatus comprising:
   a. said anchor member having threads;
   b. said cementitious member receiving said anchor member in a blind opening in said cementitious member;
   c. said adhesive member joining said anchor member to said cementitious member;
   d. a lower die, having an aperture receiving said anchor member, said lower die also having a shearing formation;
   e. an upper press, having an aperture receiving said anchor member, said upper press formed so as to be able to nest with said lower die when said upper press and said lower die are aligned and moved towards each other, said upper press also having a shearing formation formed to cooperate with said shearing formation of said lower die;
   f. a washer lying between said upper press and said lower die also receiving said anchor member, said washer being formed so as to have portions that can be broken between said shearing formations of said upper press and said lower die; and
   g. a nut attached to said threads of said anchor member.

24. A method of applying a tension load to a held anchor member to test said held anchor and then removing said tension load, said method comprising:
   a. slipping a lower die over said anchor member so that said lower die bears upon an unyielding bearing surface;
   b. slipping a washer over said anchor member and inserting said washer onto said lower die;
   c. slipping an upper press over said anchor member and onto said washer;
   d. tightening a nut onto said anchor member until said washer member is deformed in a manner such that it provides a visual indication that a given load has been applied to said washer and said washer has been pressed into said anchor member;
   e. removing said nut from said anchor member so that the compressive force is removed from said lower die, said washer and said upper press.

* * * * *